(12) United States Patent
Park et al.

(10) Patent No.: US 11,531,586 B2
(45) Date of Patent: Dec. 20, 2022

(54) CONTROLLER AND METHOD OF OPERATING THE SAME

(71) Applicant: SK hynix Inc., Gyeonggi-do (KR)

(72) Inventors: Soo Jin Park, Gyeonggi-do (KR); Won Hyoung Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/330,845

(22) Filed: May 26, 2021

(65) Prior Publication Data

US 2022/0156145 A1 May 19, 2022

(30) Foreign Application Priority Data

Nov. 19, 2020 (KR) .................. 10-2020-0156048

(51) Int. Cl.
  *G06F 3/06* (2006.01)
  *G06F 11/10* (2006.01)
  *G06F 11/07* (2006.01)

(52) U.S. Cl.
  CPC .......... *G06F 11/1068* (2013.01); *G06F 3/064* (2013.01); *G06F 3/0619* (2013.01); *G06F 3/0679* (2013.01); *G06F 11/0772* (2013.01); *G06F 11/0775* (2013.01)

(58) Field of Classification Search
  CPC .... G06F 11/1068; G06F 3/0619; G06F 3/064; G06F 3/0679; G06F 11/0772; G06F 11/0775
  USPC ...................................................... 714/764
  See application file for complete search history.

(56) References Cited

U.S. PATENT DOCUMENTS

| | | | | |
|---|---|---|---|---|
| 2004/0136411 A1* | 7/2004 | Hornbuckle | .......... | H04J 3/0685 370/537 |
| 2009/0300282 A1* | 12/2009 | Rowlands | .......... | G06F 11/1441 711/E12.001 |
| 2010/0005228 A1* | 1/2010 | Fukutomi | .......... | G06F 12/0246 711/E12.001 |
| 2011/0029841 A1* | 2/2011 | Rho | .......... | G06F 11/1068 714/763 |
| 2015/0161004 A1* | 6/2015 | Camp | .......... | G06F 3/0619 714/6.24 |
| 2015/0199234 A1* | 7/2015 | Choi | .......... | G11C 29/4401 714/764 |
| 2016/0019114 A1* | 1/2016 | Han | .......... | G06F 11/1076 714/764 |

(Continued)

FOREIGN PATENT DOCUMENTS

KR 10-2017-0042433 A 4/2017
KR 10-2023121 B1 11/2019

*Primary Examiner* — Albert Decady
*Assistant Examiner* — Enam Ahmed
(74) *Attorney, Agent, or Firm* — IP & T Group LLP

(57) ABSTRACT

A memory system includes at least one semiconductor memory device including a plurality of memory blocks in which an original data stripe including a plurality of unit data and parity data is stored, and a controller configured to control an operation of the semiconductor memory device. The controller performs an error correction operation on one or more unit data received from the semiconductor memory device, and generates data for recovery based on remaining data except for first and second unit data among the plurality of unit data, in response to a first error correction failure for the first unit data among the plurality of unit data and a second error correction failure for the second unit data.

15 Claims, 21 Drawing Sheets

(56) References Cited

U.S. PATENT DOCUMENTS

| | | | |
|---|---|---|---|
| 2017/0102996 A1* | 4/2017 | Yu | G06F 3/0683 |
| 2017/0177436 A1* | 6/2017 | Lee | H03M 13/2906 |
| 2019/0042369 A1* | 2/2019 | Deutsch | G06F 3/0673 |

* cited by examiner

| Stripe ID | UE Page | |
|---|---|---|
| DS1 | DS[1][2] | – |

FIG. 11B

| Stripe ID | UE Page | |
|---|---|---|
| DS1 | DS[1][2] | – |
| DS3 | DS[3][5] | – |

FIG. 11C

| Stripe ID | UE Page | |
|---|---|---|
| DS1 | DS[1][2] | – |
| DS3 | DS[3][5] | – |
| DS7 | DS[7][3] | – |
| ... | ... | ... |

FIG. 11D

| Stripe ID | UE Page | |
|---|---|---|
| DS1 | DS[1][2] | DS[1][4] |
| DS3 | DS[3][5] | – |
| DS7 | DS[7][3] | – |
| ... | ... | ... |

CONTROLLER AND METHOD OF OPERATING THE SAME

CROSS-REFERENCE TO RELATED APPLICATION

The present application claims priority under 35 U.S.C. § 119(a) to Korean patent application number 10-2020-0156048 filed on Nov. 19, 2020, and which is incorporated herein by reference in its entirety.

BACKGROUND

Field of Invention

The present disclosure relates to an electronic device, and more particularly, to a controller and a method of operating the same.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is a semiconductor memory device designed to resolve a limit of integration degree of a two-dimensional semiconductor memory device, and may include a plurality of memory cells that are vertically stacked on a semiconductor substrate.

A controller may control an operation of the semiconductor memory device.

SUMMARY

Embodiments of the present disclosure provide a controller capable of improving data recovery efficiency and a method of operating the same.

According to an embodiment of the present disclosure, a memory system includes at least one semiconductor memory device including a plurality of memory blocks in which an original data stripe including a plurality of unit data and parity data is stored, and a controller configured to control an operation of the semiconductor memory device. The controller performs an error correction operation on one or more unit data received from the semiconductor memory device, and generates data for recovery based on remaining data except for first and second unit data among the plurality of unit data, in response to a first error correction failure for the first unit data among the plurality of unit data and a second error correction failure for the second unit data.

In an embodiment of the present disclosure, the parity data may be data generated by performing an exclusive OR (XOR) operation on the plurality of unit data. The controller may generate the data for recovery by performing an XOR operation on the parity data and the remaining data except for the first and second unit data among the plurality of unit data included in the original data stripe.

In an embodiment of the present disclosure, the controller may generate a stripe for recovery by replacing one of the first and second unit data included in the original data stripe with the data for recovery and replacing another of the first and second unit data with zero data. The zero data may be data including zero bits.

In an embodiment of the present disclosure, the controller may control the semiconductor memory device to store the stripe for recovery.

In an embodiment of the present disclosure, the controller may control the semiconductor memory device to program the data for recovery in a first position and program the zero data in a second position, to remap one of physical positions mapped to the first and second unit data to the first position, and to remap another of the physical positions to the second position. The first position and the second position may be included in a memory block different from the plurality of memory blocks in which the original data stripe is stored.

In an embodiment of the present disclosure, the controller may recover third unit data based on the stripe for recovery, in response to a third error correction failure for the third unit data included in the stripe for recovery.

In an embodiment of the present disclosure, the controller may recover the third unit data by performing an XOR operation on the parity data and remaining unit data except for the third unit data among the plurality of unit data included in the stripe for recovery.

In an embodiment of the present disclosure, the controller may register information on the original data stripe and the first unit data in an error correction failure reference table, in response to the first error correction failure, and add information on the second unit data to the error correction failure reference table, in response to the second error correction failure.

According to another embodiment of the present disclosure, a method of operating a controller that controls at least one semiconductor memory device including a plurality of memory blocks in which an original data stripe including a plurality of unit data and parity data is stored is disclosed. The method of operating the controller includes detecting an error correction failure of first and second unit data in the original data stripe, and generating data for recovery based on the parity data and remaining unit data except for the first and second unit data among the plurality of unit data in the original data stripe.

In an embodiment of the present disclosure, detecting the error correction failure of the first and second unit data in the original data stripe may include detecting a first error correction failure for the first data in the original data stripe, updating first error correction failure information of the original data stripe in an error correction reference table, detecting a second error correction failure for the second data in the original data stripe, and updating second error correction failure information of the original data stripe in the error correction reference table.

In an embodiment of the present disclosure, generating the data for recovery based on the parity data and the remaining unit data except for the first and second unit data among the plurality of unit data in the original data stripe may include generating the data for recovery by performing an exclusive OR (XOR) operation on the remaining unit data and the parity data.

In an embodiment of the present disclosure, the method of operating the controller may further include generating a stripe for recovery by replacing one of the first and second unit data with the data for recovery and replacing another of the first and second unit data with zero data. The zero data may be data including zero bits.

In an embodiment of the present disclosure, generating the stripe for recovery may include controlling the semiconductor memory device to program the data for recovery to a first position in the at least one semiconductor memory device and program the zero data to a second position in the at least one semiconductor memory device; and remapping one of physical positions mapped to the first and second unit data to the first position, and remapping another of the physical positions to the second position.

In an embodiment of the present disclosure, the first position and the second position may be included in a memory block different from the plurality of memory blocks in which the original data stripe is stored.

In an embodiment of the present disclosure, the method of operating the controller may further include detecting a third error correction failure for third unit data in the stripe for recovery, and recovering the third unit data based on the parity data and remaining unit data except for the third unit data among the plurality of unit data included in the stripe for recovery.

In an embodiment of the present disclosure, recovering the third unit data may include performing an XOR operation on the parity data and the remaining unit data except for the third unit data among the plurality of unit data included in the stripe for recovery.

According to still another embodiment of the present disclosure, a memory system includes a memory device including a plurality of memory blocks and a controller. The controller is configured to write a data stripe to the plurality of memory blocks, the data stripe including a plurality of unit data and parity data associated with the plurality of unit data, such that data of the data stripe are respectively written to the plurality of memory blocks. The controller is further configured to perform an error correction operation on one or more unit data received from the plurality of memory blocks. When an error correction failure for the first unit data among the plurality of unit data is detected, the controller is further configured to generate recovery data using remaining data except for the first unit data among the plurality of unit data. When an error correction failure for the second unit data among the plurality of unit data is detected, the controller is further configured to generate all zero data. The controller is further configured to select first and second memory blocks among the plurality of memory blocks in which the first and second unit data are written, respectively. The controller is further configured to write data of the first and second memory blocks to first and second free blocks, respectively. The data of the first memory block includes the recovery data instead of the first unit data, and the data of the second memory block includes the all zero data instead of the second unit data.

The present technology may provide a controller capable of improving data recovery efficiency and a method of operating the same.

BRIEF DESCRIPTION OF THE DRAWINGS

FIGS. 10A to 10D are diagrams illustrating a situation in which an uncorrectable error occurs in two or more data among a plurality of data included in one data stripe.

FIGS. 11A to 11D are diagrams illustrating an error correction failure reference table according to an embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and are not limited to the embodiments described in the present specification or application.

Figure 1:
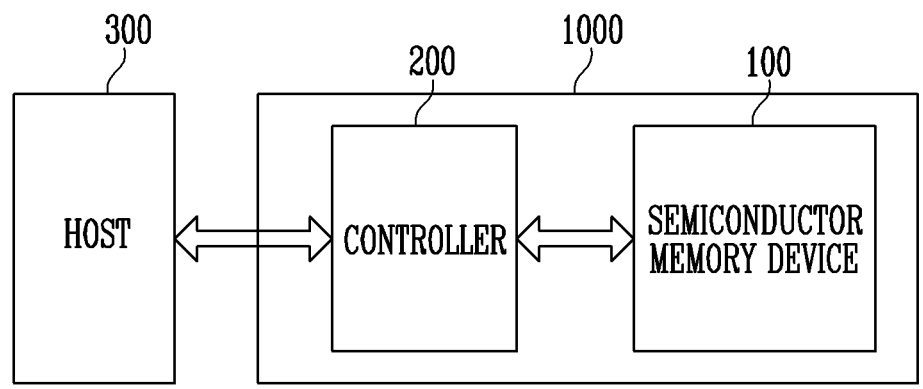
FIG. 1 is a block diagram illustrating a memory system including a controller according to an embodiment of the present disclosure.

FIG. 1 is a block diagram illustrating a memory system 1000 including a controller according to an embodiment of the present disclosure.

Referring to FIG. 1, the memory system 1000 includes a semiconductor memory device 100 and the controller 200. In addition, the memory system 1000 communicates with a host 300. The controller 200 controls an overall operation of the semiconductor memory device 100. In addition, the controller 200 controls the operation of the semiconductor memory device 100 based on a command received from the host 300.

Figure 2:
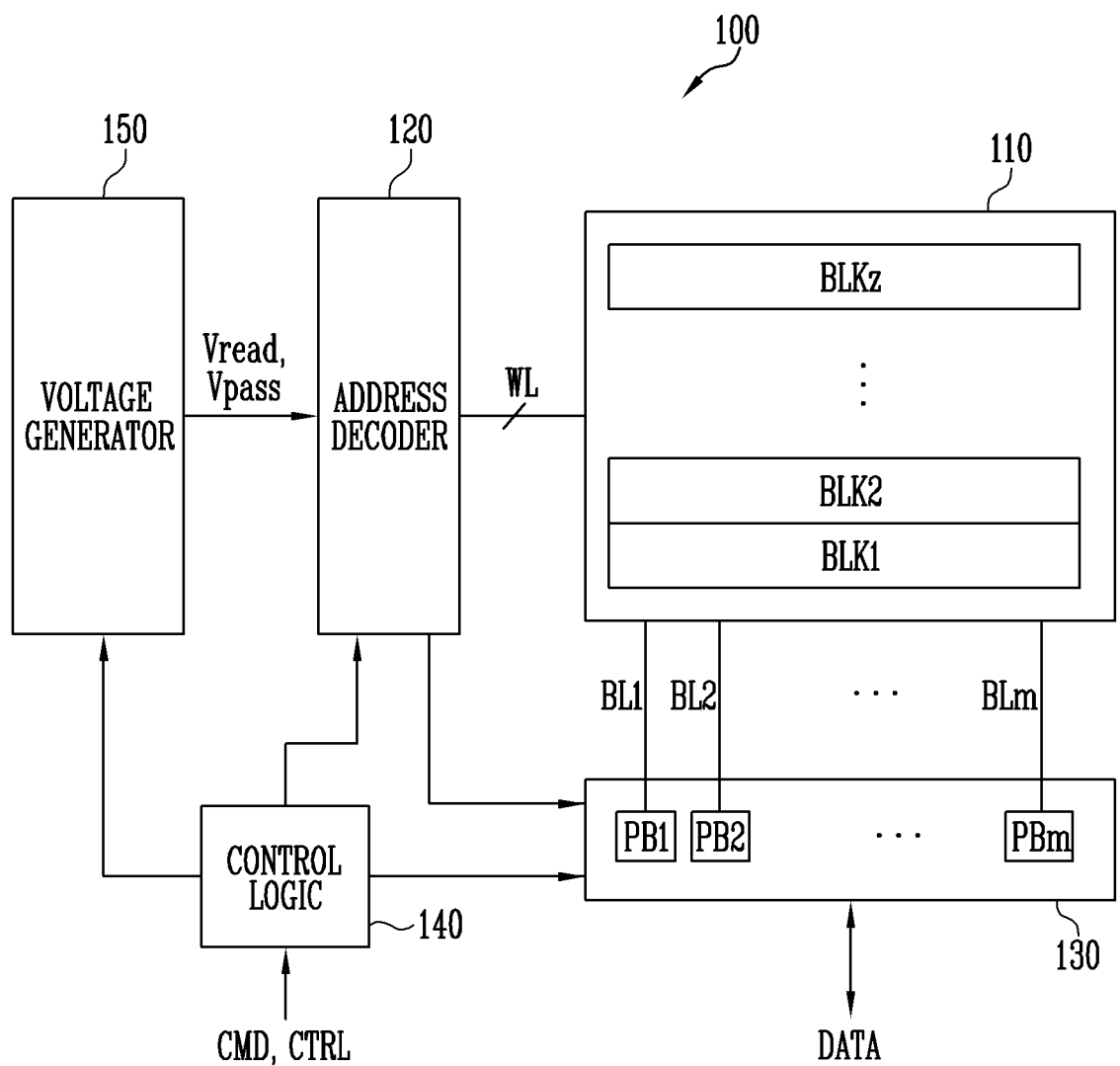
FIG. 2 is a block diagram illustrating a semiconductor memory device of FIG. 1.

FIG. 2 is a block diagram illustrating the semiconductor memory device 100 of FIG. 1.

Referring to FIG. 2, the semiconductor memory device 100 includes a memory cell array 110, an address decoder 120, a read and write circuit 130, a control logic 140, and a voltage generator 150.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Each of the plurality of memory cells included in the memory cell array may store at least one bit of data. In an embodiment, each of the plurality of memory cells included in the memory cell array 110 may be a single-level cell (SLC) storing one bit of data. In another embodiment, each of the plurality of memory cells included in the memory cell array 110 may be a multi-level cell (MLC) storing two bits of data. In still another embodiment, each of the plurality of memory cells included in the memory cell array 110 may be a triple-level cell (TLC) storing three bits of data. In still another embodiment, each of the plurality of memory cells included in the memory cell array 110 may be a quad-level cell (QLC) storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WL. The address decoder 120 is configured to operate in response to control of the control logic 140. The address decoder 120 receives an address through an input/output buffer inside the semiconductor memory device 100.

The address decoder 120 is configured to decode a block address among received addresses. The address decoder 120 selects at least one memory block according to the decoded block address. In addition, the address decoder 120 applies a read voltage Vread generated by the voltage generator 150 to a selected word line of the selected memory block at a time of a read voltage application operation during a read operation, and applies a pass voltage Vpass to the remaining unselected word lines. In addition, during a program verify operation, the address decoder 120 applies a verify voltage generated by the voltage generator 150 to the selected word line of the selected memory block, and applies the pass voltage Vpass to the remaining unselected word lines.

The address decoder 120 is configured to decode a column address of the received addresses. The address decoder 120 transmits the decoded column address to the read and write circuit 130.

A read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm sense a change of an amount of a current flowing according to a program state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer of the semiconductor memory device 100. The control logic 140 is configured to control overall operations of the semiconductor memory device 100 in response to the control signal CTRL. In addition, the control logic 140 outputs a control signal for adjusting a sensing node pre-charge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140. The voltage generator 150 may include a charge pump, and the charge pump may include the plurality of pumping capacitors described above. A specific configuration of the charge pump included in the voltage generator 150 may be variously designed as necessary.

The address decoder 120, the read and write circuit 130, and the voltage generator 150 may function as a "peripheral circuit" that performs a read operation, a write operation, and an erase operation on the memory cell array 110. The peripheral circuit performs the read operation, the write operation, and the erase operation on the memory cell array 110 based on the control of the control logic 140.

Figure 3:
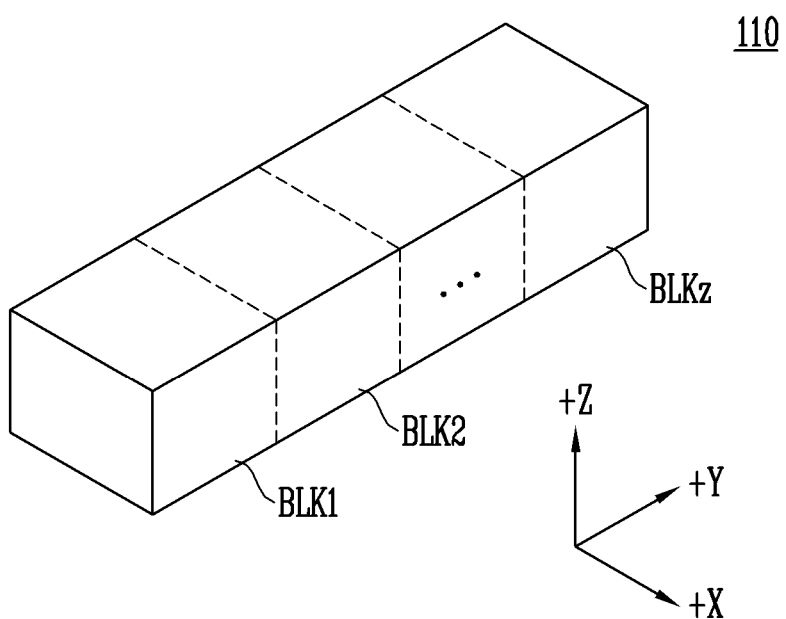
FIG. 3 is a diagram illustrating an embodiment of a memory cell array of FIG. 2.

FIG. 3 is a diagram illustrating an embodiment of the memory cell array 110 of FIG. 2.

Referring to FIG. 3, the memory cell array 110 includes a plurality of memory blocks BLK1 to BLKz. Each memory block may have a three-dimensional structure. Each memory block includes a plurality of memory cells stacked on a substrate. Such plurality of memory cells are arranged along a +X direction, a +Y direction, and a +Z direction. A structure of each memory block is described in more detail with reference to FIGS. 4 and 5.

Figure 4:
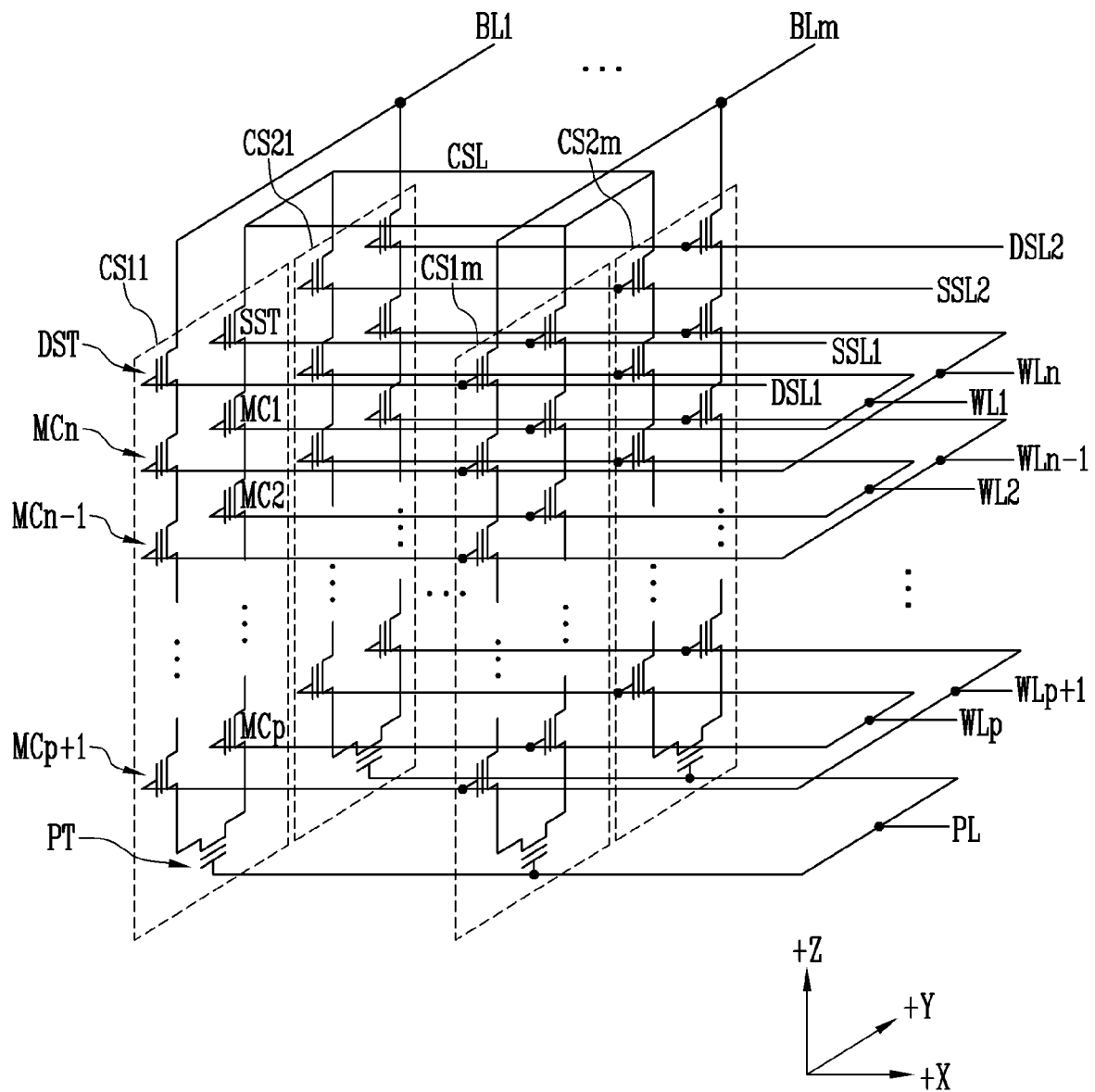
FIG. 4 is a circuit diagram illustrating a memory block BLKa of memory blocks BLK1 to BLKz of FIG. 3.

FIG. 4 is a circuit diagram illustrating a memory block BLKa of the memory blocks BLK1 to BLKz of FIG. 3.

Referring to FIG. 4, the memory block BLKa includes a plurality of cell strings CS11 to CS1*m* and CS21 to CS2*m*. In an embodiment, each of the plurality of cell strings CS11 to CS1*m* and CS21 to CS2*m* may be formed in a 'U' shape. In the memory block BLKa, m cell strings are arranged in a row direction (that is, the +X direction). In FIG. 4, two cell strings are arranged in a column direction (that is, the +Y direction). However, this is for convenience of description and it may be understood that three or more cell strings may be arranged in the column direction.

Each of the plurality of cell strings CS11 to CS1*m* and CS21 to CS2*m* includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1*m* of a first row are connected to a first source select line SSL1. The source select transistors of the cell strings CS21 to CS2*m* of a second row are connected to a second source select line SSL2.

In another embodiment, the source select transistors of the cell strings CS11 to CS1*m* and CS21 to CS2*m* may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite to the +Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The cell strings arranged in the row direction are connected to the drain select line extending in the row direction. The drain select transistors of the cell strings CS11 to CS1*m* of the first row are connected to a first drain select line DSL1. The drain select transistors of the cell strings CS21 to CS2*m* of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1*m* and CS2*m* of the m-th column are connected to the m-th bit line BLm.

The memory cells connected to the same word line in the cell strings arranged in the row direction configure one page. For example, the memory cells connected to the first word line WL1, among the cell strings CS11 to CS1*m* of the first row configure one page. The memory cells connected to the first word line WL1, among the cell strings CS21 to CS2*m* of the second row configure another page. The cell strings arranged in one row direction may be selected by selecting one of the drain select lines DSL1 and DSL2. One page of the selected cell strings may be selected by selecting one of the word lines WL1 to WLn.

In another embodiment, even bit lines and odd bit lines may be provided instead of the first to m-th bit lines BL1 to BLm. In addition, even-numbered cell strings among the cell strings CS11 to CS1*m* or CS21 to CS2*m* arranged in the row direction may be connected to even bit lines, and odd-numbered cell strings among the cell strings CS11 to CS1*m* or CS21 to CS2*m* arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
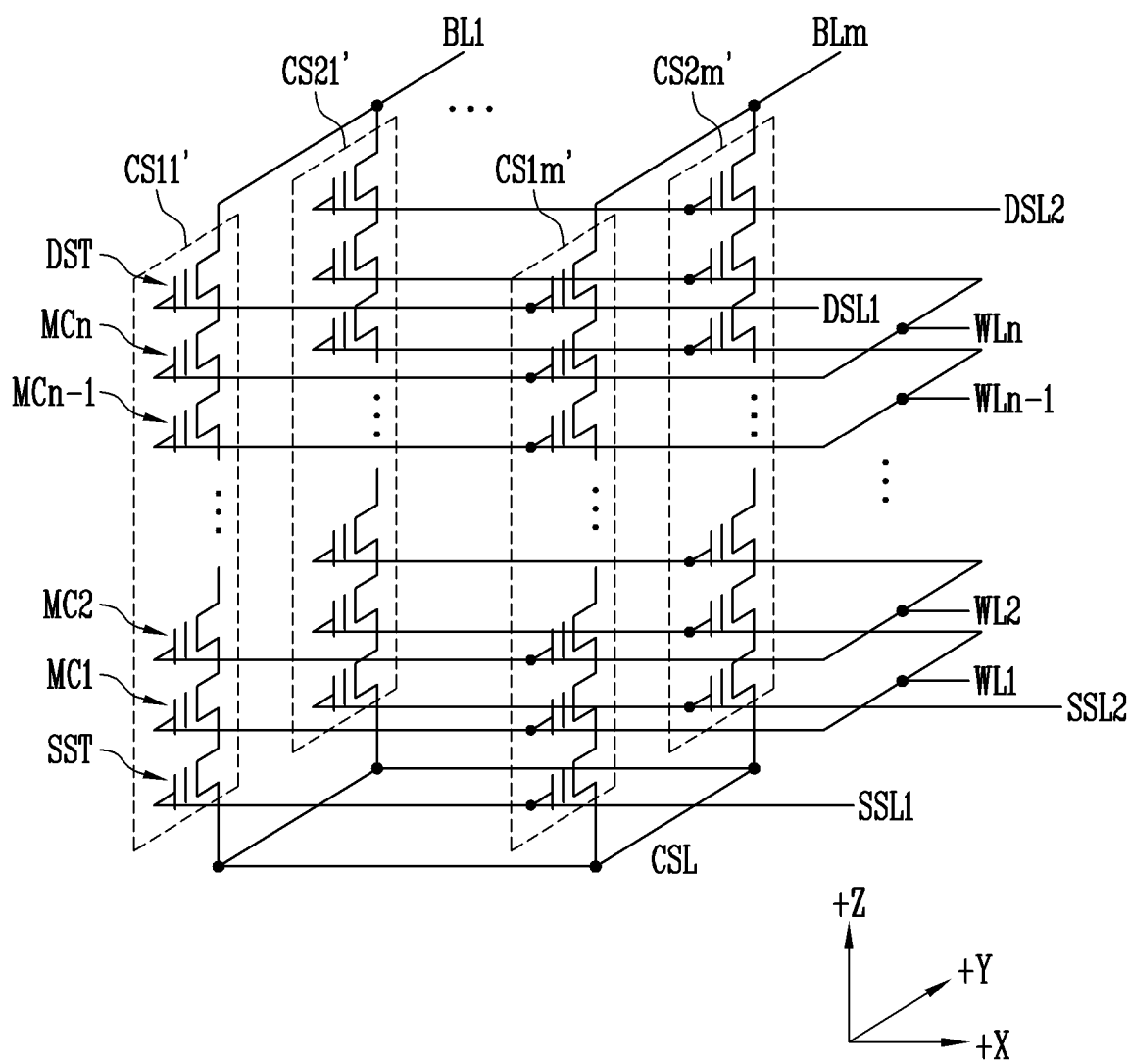
FIG. 5 is a circuit diagram illustrating another embodiment of a memory block BLKb of the memory blocks BLK1 to BLKz of FIG. 3.

FIG. 5 is a circuit diagram illustrating another embodiment of a memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate under the memory block BLKb.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. In another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to that of the memory block BLKa of FIG. 4 except that the pipe transistor PT is excluded from each cell string.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced, however, the reliability of the operation for the memory block BLKb may be reduced.

In order to efficiently control at least one dummy memory cell, each of the dummy memory cells may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
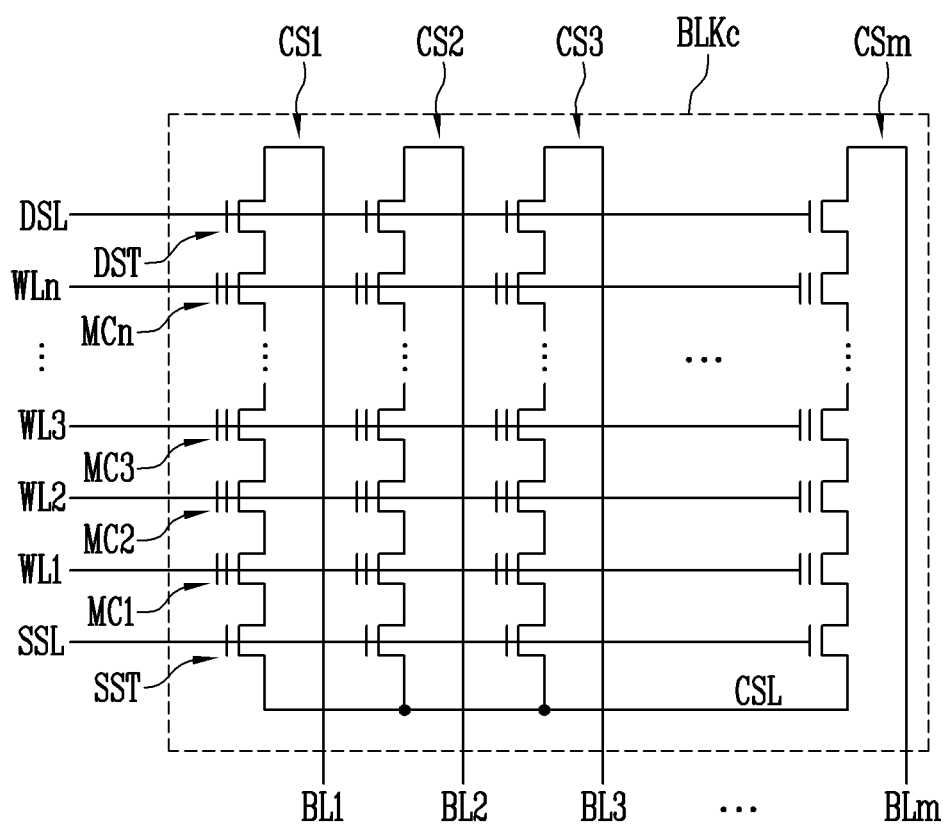
FIG. 6 is a circuit diagram illustrating an embodiment of a memory block BLKc of the memory blocks BLK1 to BLKz included in a memory cell array 110 of FIG. 2.

FIG. 6 is a circuit diagram illustrating an embodiment of a memory block BLKc of the memory blocks BLK1 to BLKz included in the memory cell array 110 of FIG. 2.

Referring to FIG. 6, the memory block BLKc includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting one of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

Figure 7:
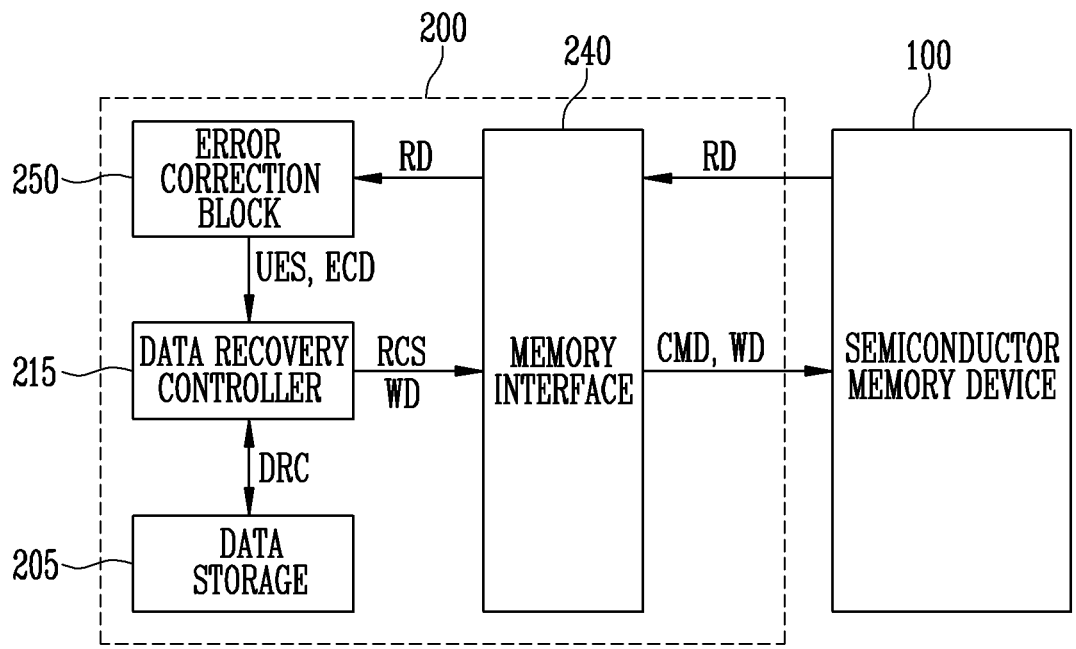
FIG. 7 is a block diagram illustrating a controller according to an embodiment of the present disclosure.

FIG. 7 is a block diagram illustrating a controller 200 according to an embodiment of the present disclosure.

Referring to FIG. 7, the controller 200 includes a data storage 205, a data recovery controller 215, a memory interface 240, and an error correction block 250.

The data storage 205 may be configured as a volatile memory, for example, a static random access memory (SRAM) or a dynamic random access memory (DRAM). The data storage 205 may store overall data needed for an operation of the controller 200. In addition, the data storage 205 may be used as at least one of a cache memory between the semiconductor memory device 100 and a host, and a buffer memory between the semiconductor memory device 100 and the host.

The data recovery controller 215 may control a recovery operation of data stored in the semiconductor memory device 100. To this end, the data recovery controller 215 may transfer a recovery control signal RCS to the memory interface 240. In addition, the data recovery controller 215 may transfer write data WD to the memory interface 240.

The memory interface 240 may perform an interfacing operation between the controller 200 and the semiconductor memory device 100. For example, the memory interface 240 may transfer various commands CMD and write data WD to the semiconductor memory device 100. In addition, the memory interface 240 may receive read data RD from the semiconductor memory device 100. The memory interface 240 may transfer the received read data RD to the error correction block 250.

The error correction block 250 may perform an error correction operation on the read data RD, which is received from the semiconductor memory device 100 through the memory interface 240. When error correction for the received read data is successful, the error correction block 250 may transfer error corrected data ECD to the data recovery controller 215. In addition, when the error correction for the received read data is failed, the error correction block 250 may transfer an uncorrectable error signal UES to the data recovery controller 215. In the present specification, an occurrence of an uncorrectable error for data means that the error correction for the corresponding data has failed.

In some embodiments, the data recovery controller 215 may generate data for recovery DRC when the uncorrectable error occurs in two or more data in one data stripe. The generated data for recovery DRC may be temporarily stored in the data storage 205. In addition, the data for recovery DRC may be transferred to the memory interface 240 as the write data WD by the data recovery controller 215. The memory interface 240 may transfer the write data WD and the command CMD for a write operation to the semiconductor memory device 100, based on the recovery control signal RCS from the data recovery controller 215. The semiconductor memory device 100 may program the write data WD in response to the received command CMD. That is, the data for recovery DRC of the data storage 205 may be programmed to the semiconductor memory device 100.

In addition, the data for recovery DRC programmed to the semiconductor memory device 100 is used to recover an additional uncorrectable error, which occurs in a stripe in which two or more uncorrectable errors occur. A method of generating the data for recovery DRC and a method of recovering the additional uncorrectable error through the same are described with reference to FIGS. 8A to 22.

Figure 8A:
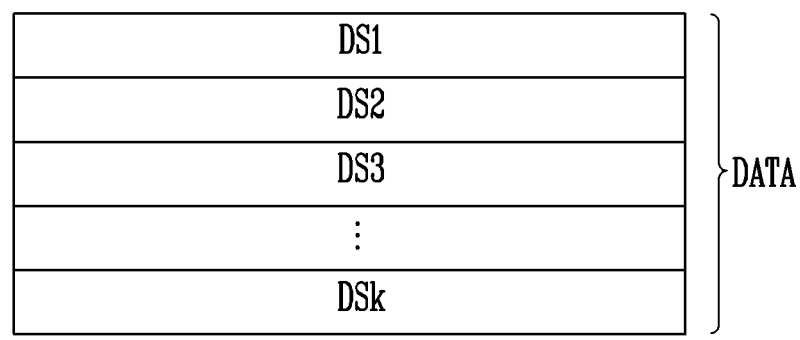
FIGS. 8A and 8B are diagrams illustrating a structure of data processed by a controller according to an embodiment of the present disclosure.
Figure 8B:
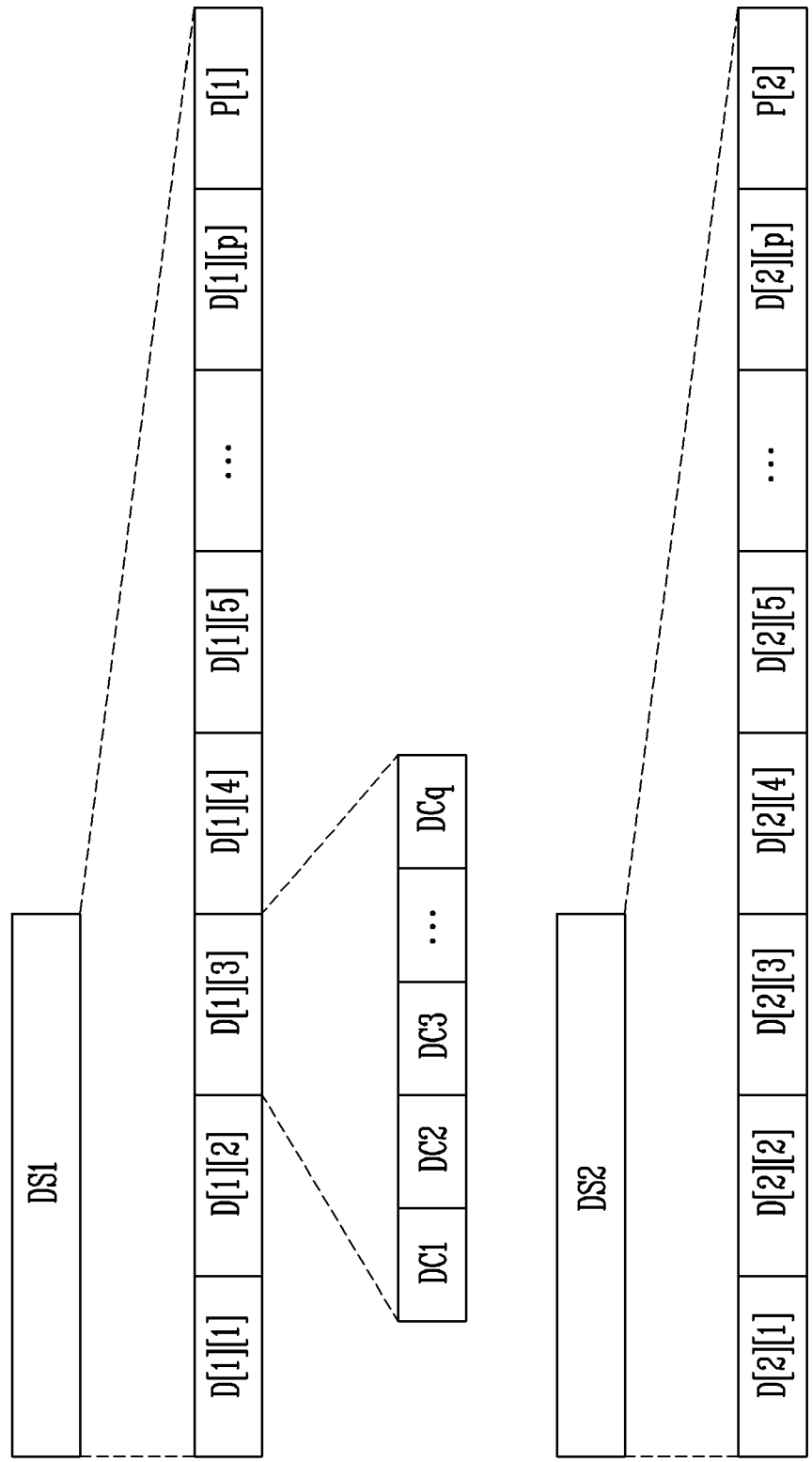

FIGS. 8A and 8B are diagrams illustrating a structure of data processed by the controller 200 according to an embodiment of the present disclosure. Referring to FIG. 8A, data DATA includes a plurality of data stripes DS1 to DSk.

According to an embodiment of the present disclosure, the data DATA may be transmitted between the memory system 1000 and the host 300 in a "data stripe" unit. A user of the host 300 or the memory system 1000 may select a size of a data stripe.

Referring to FIG. 8B, a structure of the data stripe is shown. In FIG. 8B, a first data stripe DS1 may include a plurality of data D[1][1], D[1][2], . . . , D[1][p], and P[1]. Each of the plurality of data D[1][1], D[1][2], . . . , D[1][p], and P[1] included in the first data stripe DS1 may be data of a page unit. Similarly, a second data stripe DS2 may include a plurality of data D[2][1], D[2][2], . . . , D[2][p], and P[2]. Each of the plurality of data D[2][1], D[2][2], . . . , D[2][p], and P[2] included in the second data stripe DS2 may be data of a page unit.

Among the plurality of data D[1][1], D[1][2], . . . , D[1][p], and P[1] included in the first data stripe DS1, the data D[1][1], D[1][2], . . . , and D[1][p] may include user data received from the host 300. Moreover, among the plurality of data D[1][1], D[1][2], . . . , D[1][p], and P[1] included in the first data stripe DS1, the data P[1] may be parity data. The parity data P[1] may be data for recovering the uncorrectable error when the uncorrectable error occurs in one of data the data D[1][1], D[1][2], . . . , and D[1][p] included in the first data stripe DS1. In an embodiment, the parity data P[1] may be data generated by performing an exclusive OR (XOR) operation on the data D[1][1], D[1][2], . . . , and D[1][p] in a bit unit.

Each of the plurality of data D[1][1], D[1][2], . . . , D[1][p], and P[1] included in the first data stripe DS1 may include a plurality of data chunks. For example, as shown in FIG. 8B, the data D[1][3] may include first to q-th data chunks DC1 to DCq. Each of other data D[1][1], D[1][2], D[1][4], D[1][5], . . . , D[1][p], and P[1] may also include q data chunks. The data chunk may be a data size that is a unit of an error correction operation performed by the error correction block 250.

In FIG. 8B, the first data stripe DS1 includes (p+1) data D[1][1], D[1][2], . . . , D[1][p], and P[1], and each data includes q data chunks. The p and q values may be variously selected according to need. The plurality of data configuring one data stripe may be distributed and stored in a plurality of memory blocks.

Figure 9:
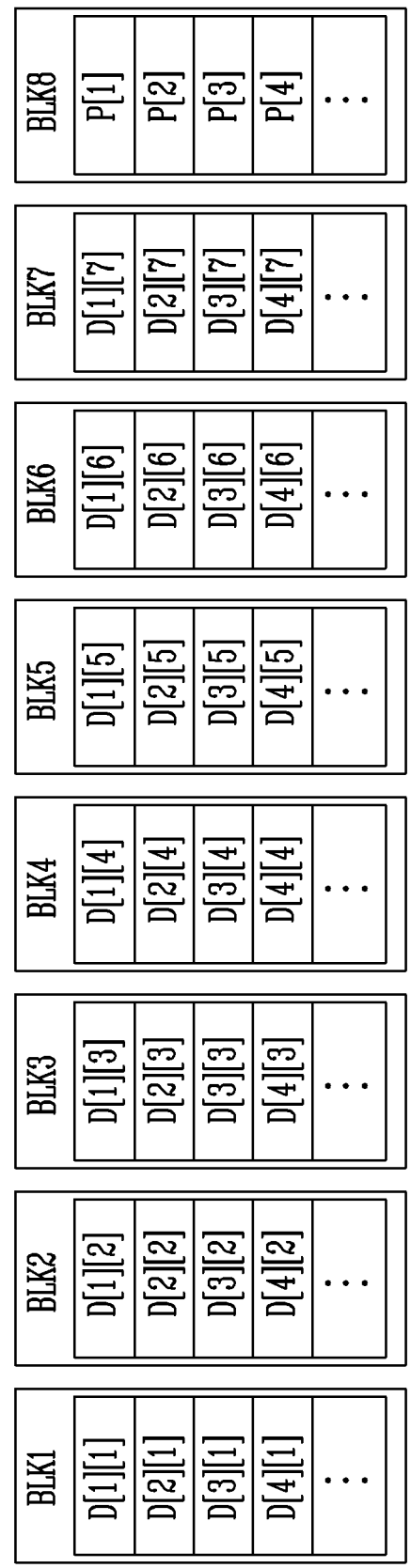
FIG. 9 is a diagram illustrating data stored in a plurality of memory blocks according to an embodiment of the present disclosure.

FIG. 9 is a diagram illustrating data stored in a plurality of memory blocks according to an embodiment of the present disclosure.

Referring to FIG. 9, an embodiment in which data configuring one data stripe is distributed and stored in eight memory blocks BLK1 to BLK8 is shown. That is, in the embodiment of FIG. 9, p value described with reference to FIG. 8 is 7.

Data D[1][1], D[1][2], . . . , D[1][7], and P[1] configure a first data stripe DS1, and data D[2][1], D[2][2], . . . , D[2][7], and P[2] configure a second data stripe DS2. In addition, data D[3][1], D[3][2], . . . , D[3][7], and P[3] configure a third data stripe DS3, and data D[4][1], D[4][2], . . . , D[4][7], and P[4] configure a fourth data stripe DS4.

In an embodiment, the first to eighth memory blocks BLK1 to BLK8 shown in FIG. 9 may be included in one semiconductor memory device. However, the present disclosure is not limited thereto, and the first to eighth memory blocks BLK1 to BLK8 may be included in at least two or more semiconductor memory devices. In an embodiment, each of the first to eighth memory blocks BLK1 to BLK8 may be included in eight different semiconductor memory devices. In this case, the plurality of semiconductor memory devices may be connected to the controller through at least one channel.

As described above, the parity data P[1] may be data generated by performing an XOR operation on the data D[1][1], D[1][2], . . . , and D[1][p] in a bit unit. Therefore, a relationship between the parity data P[1] and the data D[1][1], D[1][2], . . . , and D[1][p] may be expressed as Equation 1 below.

$$P[1]=D[1][1] \oplus D[1][2] \oplus D[1][3] \oplus \ldots \oplus D[1][p-1] \oplus D[1][p]$$ [Equation 1]

Figures 10A, 10B, 10C, 10D:
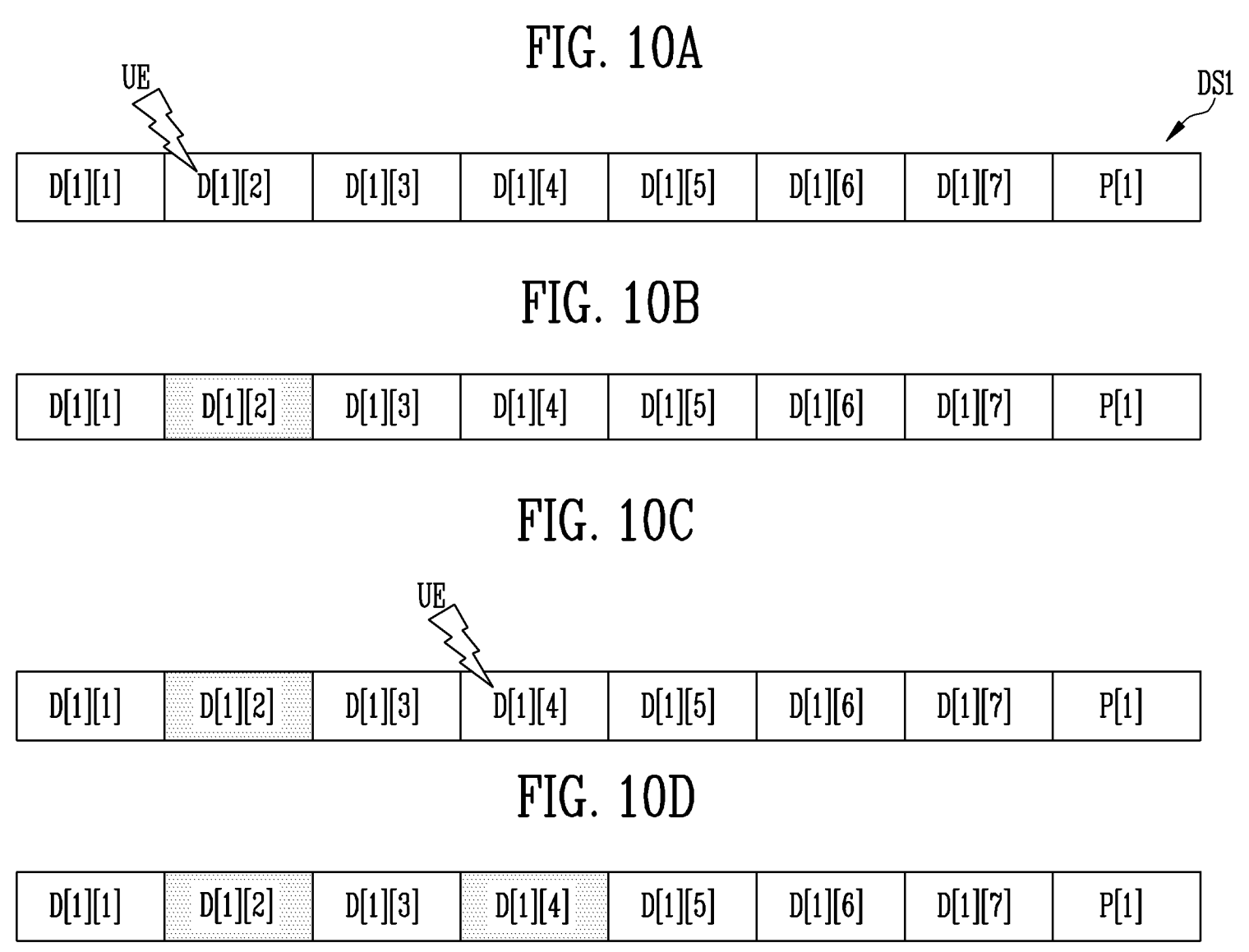

FIGS. 10A to 10D are diagrams illustrating a situation in which an uncorrectable error occurs in two or more data among a plurality of data included in one data stripe. In FIGS. 10 to 10D, only the first data stripe DS1 is schematically shown by way of example.

Referring to FIG. 10A, a situation in which the uncorrectable error UE occurs in the data D[1][2] among the data D[1][1], D[1][2], . . . , D[1][7], and P[1] included in the first data stripe DS1 is shown. In this case, the data D[1][2] in which the uncorrectable error UE occurs may be recovered, by performing an XOR operation on the remaining data D[1][1], D[1][3], D[1][4], D[1][5], D[1][6], D[1][7], and P[1] except for the data D[1][2] in which the uncorrectable error UE occurs among the data D[1][1], D[1][2], D[1][7], and P[1] included in the first data stripe DS1. That is, the data D[1][2] may be recovered through a relationship of Equation 2 below.

$$D[1][2]=D[1][1]\oplus D[1][3]\oplus D[1][4]\oplus D[1][5]\oplus D[1][6]\oplus D[1][7]\oplus P[1] \quad \text{[Equation 2]}$$

In some embodiments, the controller 200 may update information on data in which the uncorrectable error UE occurs. To this end, the data recovery controller 215 of the controller 200 may manage an error correction failure reference table to be described later with reference to FIGS. 11A to 11D. Accordingly, it may be known that the uncorrectable error occurs in the data D[1][2] of the first data stripe DS1 later as shown in FIG. 10B.

Referring to FIG. 10C, a situation, in which after the uncorrectable error UE, that is, a first error, occurs in the data D[1][2], an uncorrectable error UE, that is, a second error, occurs in the D[1][4] among the data D[1][1], D[1][2], . . . , D[1][7], and P[1] included in the first data stripe DS1, is shown. Accordingly, the controller 200 may update information on data in which the second uncorrectable error UE occurs. To this end, the data recovery controller 215 of the controller 200 may update the error correction failure reference table. Accordingly, it may be known that the uncorrectable error occurs in the data D[1][2] and the data D[1][4] of the first data stripe DS1 later as shown in FIG. 10D.

When two uncorrectable errors UE occur in one data stripe, the data in which the second error occurs may not be recovered.

According to a method of operating the controller 200 according to an embodiment of the present disclosure, when two uncorrectable errors UE occur in one data stripe, data for recovery and zero data are generated based on other data in which an error does not occur in a corresponding data stripe. Thereafter, when an uncorrectable error UE, that is, a third error occurs in the corresponding data stripe, data in which the third error occurs is recovered based on the data for recovery and the zero data. Accordingly, data recovery efficiency of the memory system 1000 may be improved.

FIGS. 11A to 11D are diagrams illustrating an error correction failure reference table according to an embodiment of the present disclosure. Hereinafter, the error correction failure reference table and a method of updating the error correction failure reference table are described with reference to FIGS. 10A to 10D together.

As described with reference to FIG. 10A, when the first error occurs in the data D[1][2] in the first data stripe DS1, the data recovery controller 215 registers the first data stripe DS1 in the error correction failure reference table. As shown in FIG. 11A, the error correction failure reference table may include two fields. A first field is a stripe identifier (ID) for distinguishing a data stripe, and a second field is a page indicating data in which the uncorrectable error occurs in a corresponding data stripe (i.e., UE Page). Referring to FIG. 11A, the first data stripe DS1 in which the uncorrectable error occurs is registered in the error correction failure reference table. In addition, referring to FIG. 11A, the first error occurs in the data D[1][2] in the first data stripe DS1.

A case where after the first error occurs in the data D[1][2] in the first data stripe DS1, an uncorrectable error occurs in data DS[3][5] in a third data stripe DS3 is considered. In this case, as shown in FIG. 11B, the third data stripe DS3 is registered in the error correction failure reference table. Information on the data DS[3][5] in which the error occurs in the third data stripe DS3 is also included in the error correction failure reference table.

Similarly, a case where after the error occurs in the data D[3][5] in the third data stripe DS3, an uncorrectable error occurs in data DS[7][3] of a seventh data stripe DS7 is considered. In this case, as shown in FIG. 11C, the seventh data stripe DS7 is registered in the error correction failure reference table. Information on the data DS[7][3] in which the error occurs in the seventh data stripe DS7 is also included in the error correction failure reference table.

Thereafter, as shown in FIG. 10C, when the uncorrectable error, that is, the second error occurs in the data D[1][4] among the data D[1][1], D[1][2], . . . , D[1][7], and P[1] included in the first data stripe DS1, this is updated in the error correction failure reference table. As shown in FIG. 11D, the error correction failure reference table may be updated to know that the second error occurs in the data D[1][4] with respect to the already registered first data stripe DS1.

The error correction failure reference table as shown in FIGS. 11A to 11D may be generated by the data recovery controller 215. The error correction failure reference table may be stored in the data storage 205.

According to the controller and the method of operating the same according to an embodiment of the present disclosure, when two uncorrectable errors occur in one data stripe, the data for recovery is generated. The data for recovery is data for recovering the data in which a third error occurs when the third error occurs later in another data of the corresponding data stripe. Hereinafter, as described with reference to FIGS. 10A to 11D, a method of generating the data for recovery in a case where the first error occurs in data D[1][2] of the first data stripe DS1 and the second error occurs in the data D[1][4] is described.

Figure 12A:
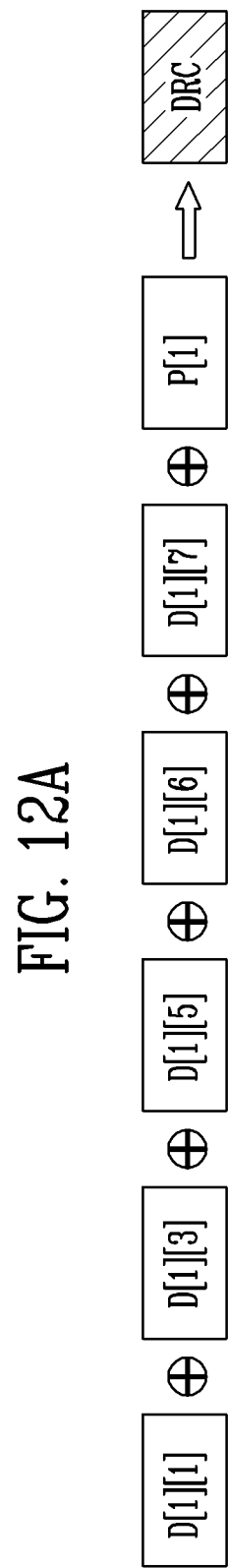
FIGS. 12A and 12B are diagrams illustrating data for recovery generated according to an embodiment of the present disclosure.
Figures 12B, 13:
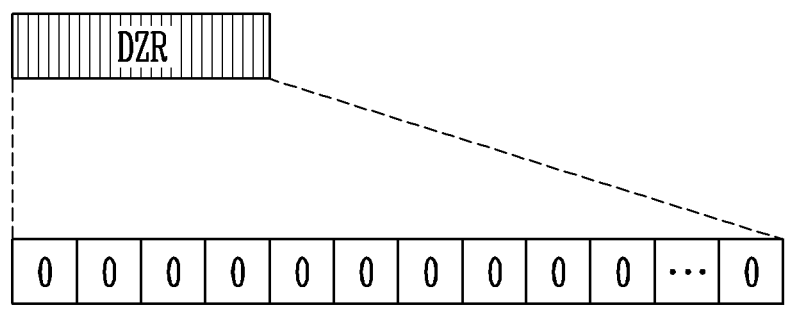
FIG. 13 is a diagram illustrating zero data generated according to an embodiment of the present disclosure.

FIGS. 12A and 12B are diagrams illustrating data for recovery generated according to an embodiment of the present disclosure.

Referring to FIG. 12A, when the first error occurs in the data D[1][2] of the first data stripe DS1 and the second error occurs in the data D[1][4], the data for recovery DRC may be generated by performing an XOR operation on the data except for the data D[1][2] and the data D[1][4] in the first data stripe DS1. To this end, the data D[1][1], D[1][3], D[1][5], D[1][6], D[1][7], and P[1] of the first data stripe DS1 are read by the semiconductor memory device 100. The read data D[1][1], D[1][3], D[1][5], D[1][6], D[1][7], and P[1] may be transferred to the error correction block 250 of the controller 200. The error correction block 250 may perform an error correction operation on each of the received data D[1][1], D[1][3], D[1][5], D[1][6], D[1][7], and P[1], and transfer error corrected corresponding data to the data recovery controller 215.

The data recovery controller 215 may generate the data for recovery DRC according to a method of Equation 3 below.

$$DRC=D[1][1]\oplus D[1][3]\oplus D[1][5]\oplus D[1][6]\oplus D[1][7]\oplus P[1] \quad \text{[Equation 3]}$$

When p is 7 in Equation 1, a relationship of following Equation 4 is established.

$$P[1]=D[1][1]\oplus D[1][2]\oplus D[1][3]\oplus D[1][4]\oplus D[1][5]\oplus D[1][6]\oplus D[1][7] \quad \text{[Equation 4]}$$

Since an XOR operation satisfies an associative law and a commutative law, when Equation 3 and Equation 4 above are combined, a result of Equation 5 below may be derived.

$$DRC = D[1][2] \oplus D[1][4] \quad \text{[Equation 5]}$$

That is, the data for recovery DRC may be generated by the XOR operation of other correctable data D[1][1], D[1][3], D[1][5], and D[1][6], D[1][7], and P[1] in which the first and second errors do not occur. The data for recovery DRC is the same as a result of performing an XOR operation on the data D[1][2] and D[1][4] in which the first and second errors occur. That is, Equation 3 and Equation 5 are mathematically equivalent. Using this, when additionally the third error occurs in the remaining data D[1][1], D[1][3], D[1][5], and D[1][6], D[1][7], and P[1] in which the first and second errors do not occur in the first data stripe, the data in which the third error occurs may be recovered using the data for recovery DRC and the zero data. The zero data is described with reference to FIG. 13.

FIG. 13 is a diagram illustrating zero data generated according to an embodiment of the present disclosure.

As shown in FIG. 13, the zero data DZR may be data in which all bits are 0. A size of the zero data DZR may be the same as a size of each of data included in the data stripe. For example, the size of the zero data DZR may be the same as a page size.

Figure 14:
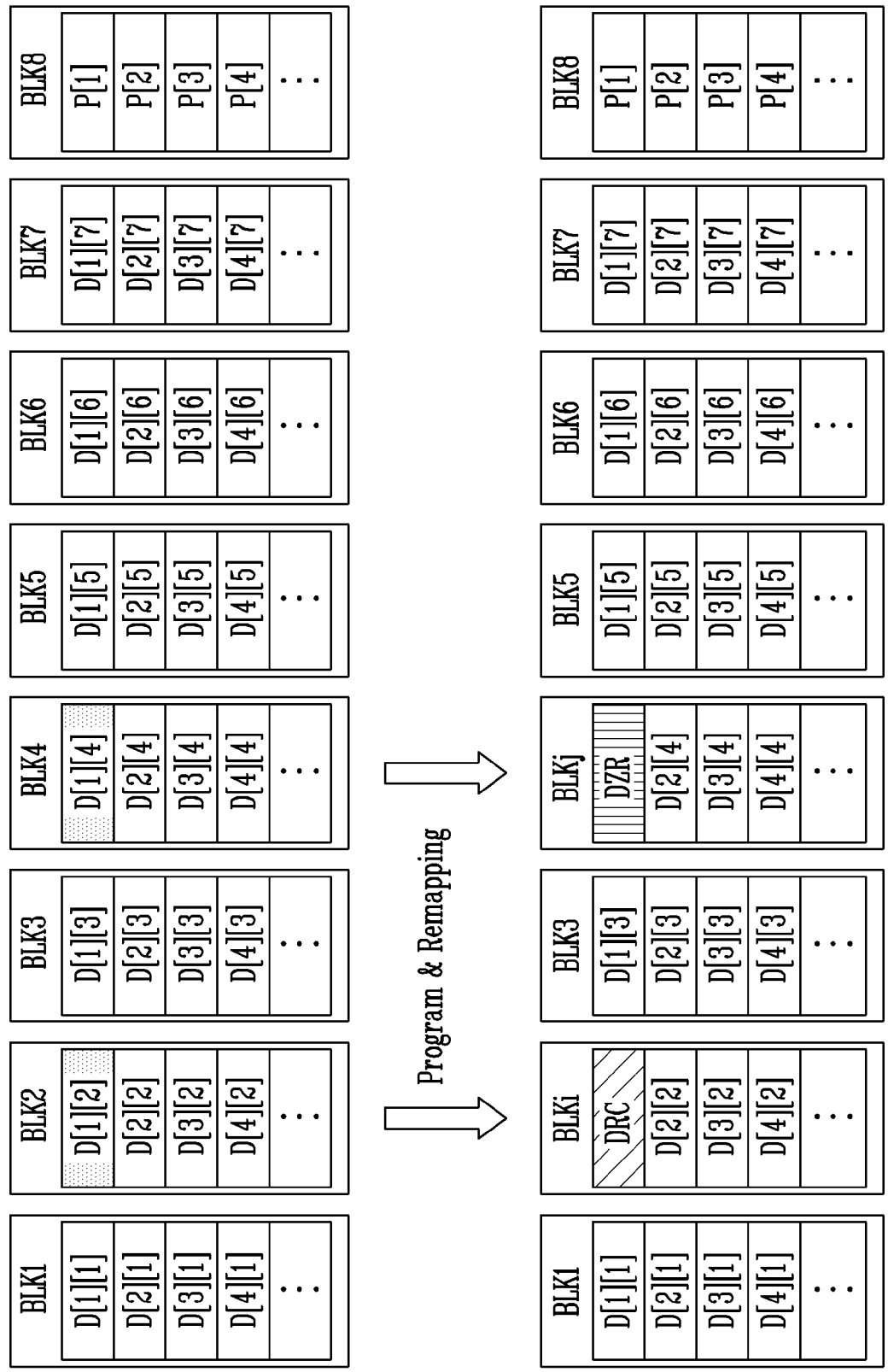
FIG. 14 is a diagram illustrating a method of generating a stripe for recovery based on data for recovery and zero data according to an embodiment of the present disclosure.

FIG. 14 is a diagram illustrating a method of generating a stripe for recovery based on data for recovery and zero data according to an embodiment of the present disclosure.

According to the controller and the method of operating the same according to an embodiment of the present disclosure, when two uncorrectable errors occur in one data stripe, the data for recovery DRC described with reference to FIGS. 12A and 12B and the zero data DZR described with reference to FIG. 13 are generated. According to the controller and the method of operating the same according to an embodiment of the present disclosure, the stripe for recovery is generated by replacing the data in which the first and second errors occur with the generated data for recovery DRC and zero data DZR.

As shown in FIG. 14, when the uncorrectable error occurs in the data D[1][2] and the data D[1][4] of the first data stripe DS1, the data D[1][2] and the data D[1][4] are replaced with the data for recovery DRC and the zero data DZR.

More specifically, the data for recovery DRC is programmed in the i-th memory block BLKi, which is a free block, instead of the data D[1][2] in which the uncorrectable error occurs among the data programmed in the second memory block BLK2. Other data D[2][2], D[3][2], D[4][2], . . . that are programmed in the second memory block BLK2 are copied to the i-th memory block BLKi.

The zero data DZR is programmed in the j-th memory block BLKj, which is a free block, instead of the data D[1][4] in which the uncorrectable error occurs among the data programmed in the fourth memory block BLK4. Other data D[2][4], D[3][4], D[4][4], . . . programmed in the fourth memory block BLK4 are copied to the j-th memory block BLKj.

Thereafter, a physical address mapping of the second memory block BLK2 is remapped to the i-th memory block BLKi, and a physical address mapping of the fourth memory block BLK4 is remapped to the j-th memory block BLKj.

After remapping, the second memory block BLK2 and the fourth memory block BLK4 may be released as free blocks.

As a result, the stripe for recovery may be generated by replacing the data D[1][2] and the data D[1][4] of the first data stripe DS1, which is the original data stripe, with the data for recovery DRC and the zero data DZR. The stripe for recovery includes the data D[1][1], DRC, D[1][3], DZR, D[1][5], D[1][6], D[1][7], and P[1]. Hereinafter, a method of recovering an additional uncorrectable error using the stripe for recovery is described.

FIGS. 15A and 15B are diagrams illustrating a method of recovering data when an uncorrectable error occurs in any of data included in the stripe for recovery RS1 generated by FIG. 14. Referring to FIG. 15A, a situation in which an uncorrectable error UE occurs in the data D[1][6] in the stripe for recovery RS1 is shown. In this case, the data D[1][6] may be recovered in a method as shown in FIG. 15B. More specifically, when Equation 4 is summarized related to the data D[1][6], a result of Equation 6 below is obtained.

$$D[1][6] = D[1][1] \oplus D[1][2] \oplus D[1][3] \oplus D[1][4] \oplus D[1][5] \oplus D[1][7] \oplus P[1] \quad \text{[Equation 6]}$$

As described through Equation 5 above, the data for recovery DRC is the same as the data obtained by performing the XOR operation on the data D[1][2] and the D[1][4] in which the first and second errors occur previously. Therefore, when the data D[1][2] and the D[1][4] are replaced with the data for recovery DRC in Equation 6, a result of Equation 7 is obtained.

$$D[1][6] = D[1][1] \oplus DRC \oplus D[1][3] \oplus D[1][5] \oplus D[1][7] \oplus P[1] \quad \text{[Equation 7]}$$

Since bit "0" is an identity of an XOR operation, even though an XOR operation is performed on a right side of Equation 7 with the zero data DZR, an equality relationship is maintained. Accordingly, a relationship of Equation 8 below is obtained.

$$D[1][6] = D[1][1] \oplus DRC \oplus D[1][3] \oplus DRZ \oplus D[1][5] \oplus D[1][7] \oplus P[1] \quad \text{[Equation 7]}$$

When Equation 8 above is schematically represented, it may be known that it is the same as that of FIG. 15B. This means that when the uncorrectable error occurs in any data in the stripe for recovery, for example, the data D[1][6], the data D[1][6] may be recovered by performing an XOR operation on the remaining data except for the data D[1][6] in which the uncorrectable error occurs among the data in the stripe for recovery.

That is, according to the controller and the method of operating the same according to an embodiment of the present disclosure, when the uncorrectable error occurs in two data among the plurality of data in one data stripe, the data for recovery is generated using the remaining data in which an error does not occur. The stripe for recovery is generated based on the remaining data in which an error does not occur in the data stripe, the data for recovery, and the zero data. Thereafter, when the uncorrectable error additionally occurs in any one of the data in the stripe for recovery, the data in which the additional error occurs may be recovered using the data in the stripe for recovery. Accordingly, data recovery efficiency of the memory system 1000 is improved.

Figure 16:
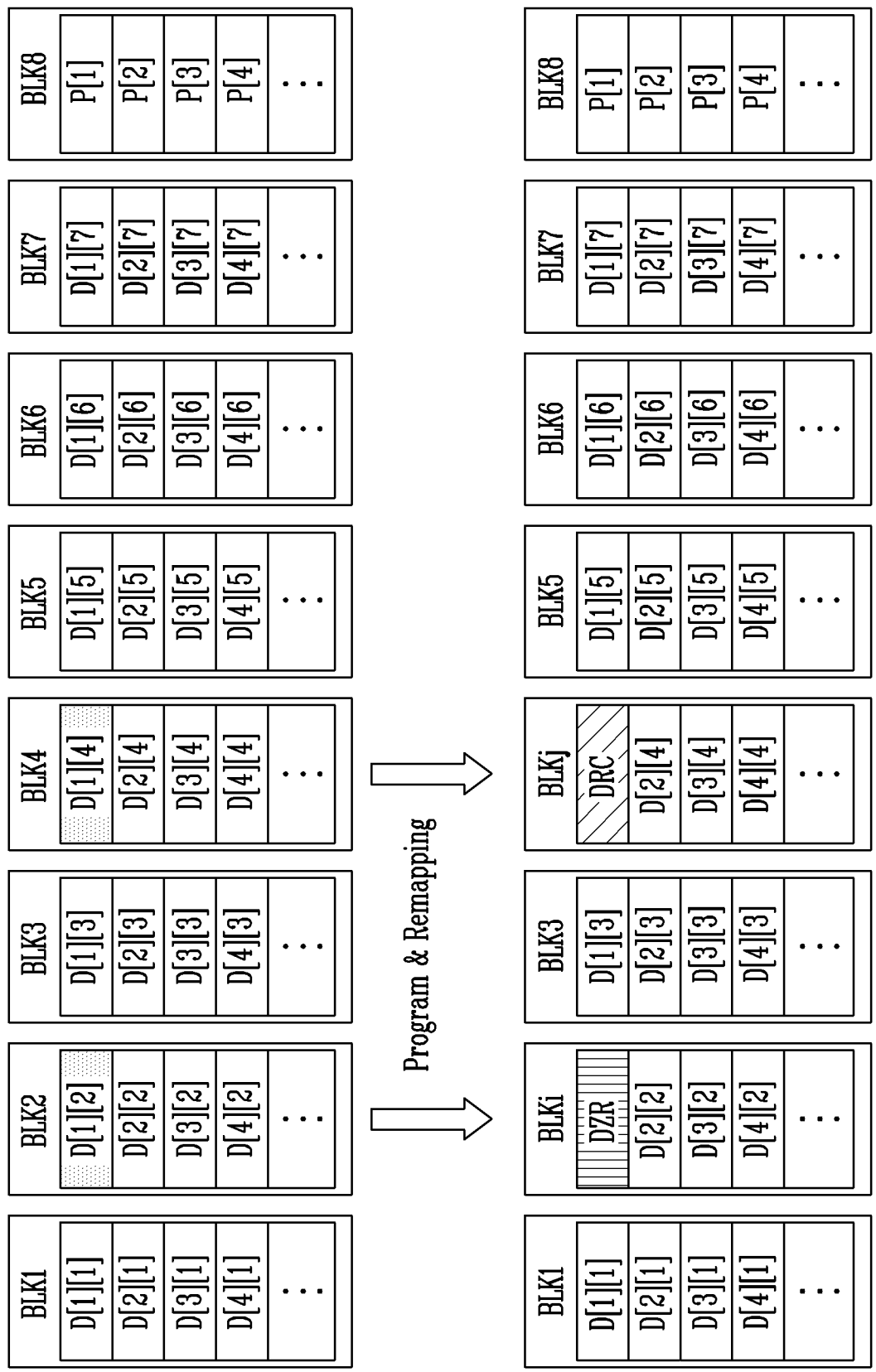
FIG. 16 is a diagram illustrating a method of generating a stripe for recovery based on data for recovery and zero data according to another embodiment of the present disclosure.

FIG. 16 is a diagram illustrating a method of generating a stripe for recovery based on data for recovery and zero data according to another embodiment of the present disclosure.

Referring to FIG. 16, when the uncorrectable error occurs in the data D[1][2] and the data D[1][4] of the first data stripe DS1, the data D[1][2] and the data D[1][4] are replaced with the zero data DZR and the data for recovery DRC, respectively.

More specifically, the zero data DZR is programmed in the i-th memory block BLKi, which is a free block, instead of the data D[1][2] in which the uncorrectable error occurs among the data programmed in the second memory block BLK2. The other data D[2][2], D[3][2], D[4][2], . . . that are programmed in the second memory block BLK2 are copied to the i-th memory block BLKi.

The data for recovery DRC is programmed in the j-th memory block BLKj, which is a free block, instead of the data D[1][4] in which the uncorrectable error occurs among the data programmed in the fourth memory block BLK4. The other data D[2][4], D[3][4], D[4][4], . . . that are programmed in the fourth memory block BLK4 are copied to the j-th memory block BLKj.

Thereafter, the physical address mapping of the second memory block BLK2 is remapped to the i-th memory block BLKi, and the physical address mapping of the fourth memory block BLK4 is remapped to the j-th memory block BLKj. After remapping, the second memory block BLK2 and the fourth memory block BLK4 may be released as free blocks.

As described above, the embodiment shown in FIG. 14 illustrates a method of programming the data for recovery DRC in the i-th memory block BLKi instead of the data D[1][2] in which the uncorrectable error occurs among the data programmed in the second memory block BLK2 and programming the zero data DZR in the j-th memory block BLKj instead of the data D[1][4] in which the uncorrectable error occurs among the data programmed in the fourth memory block BLK4. However, the present disclosure is not limited thereto. Even though an operation order of the data for recovery DRC and the zero data DZR is changed as shown in FIG. 16, compared with FIG. 14, an operation result does not change. Therefore, as shown in FIG. 16, an order of the data for recovery DRC and the zero data DZR may be changed and programmed.

Figure 17:
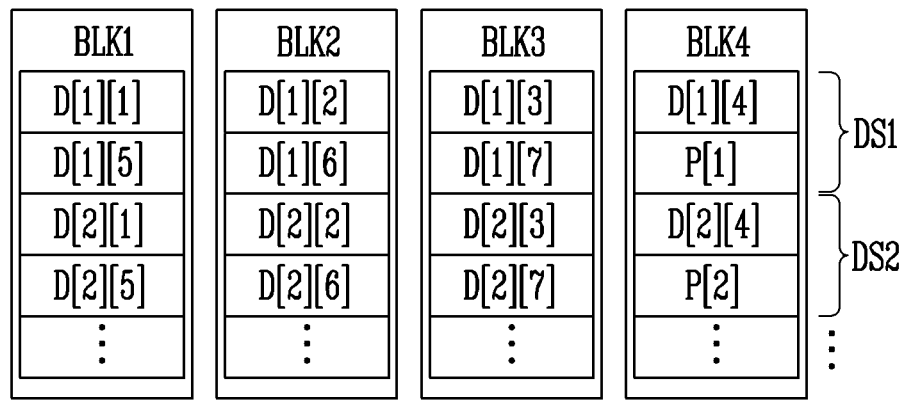
FIG. 17 is a diagram illustrating data stored in a plurality of memory blocks according to another embodiment of the present disclosure.

FIG. 17 is a diagram illustrating data stored in a plurality of memory blocks according to another embodiment of the present disclosure.

Figure 15:
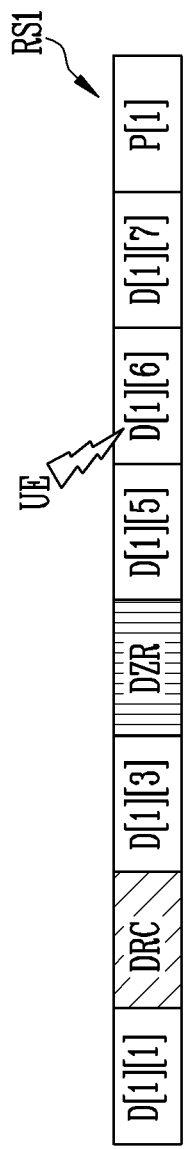
FIGS. 15A and 15B are diagrams illustrating a method of recovering data when an uncorrectable error occurs in one of data included in a stripe for recovery generated by FIG. 14.

As described in FIGS. 14 to 16, one memory block stores only one of a plurality of data configuring one data stripe. However, the present disclosure is not limited thereto. In an embodiment as shown in FIG. 17, one memory block may store two data among the plurality of data configuring one data stripe. In this case, four memory blocks may store one data stripe.

Figure 18:
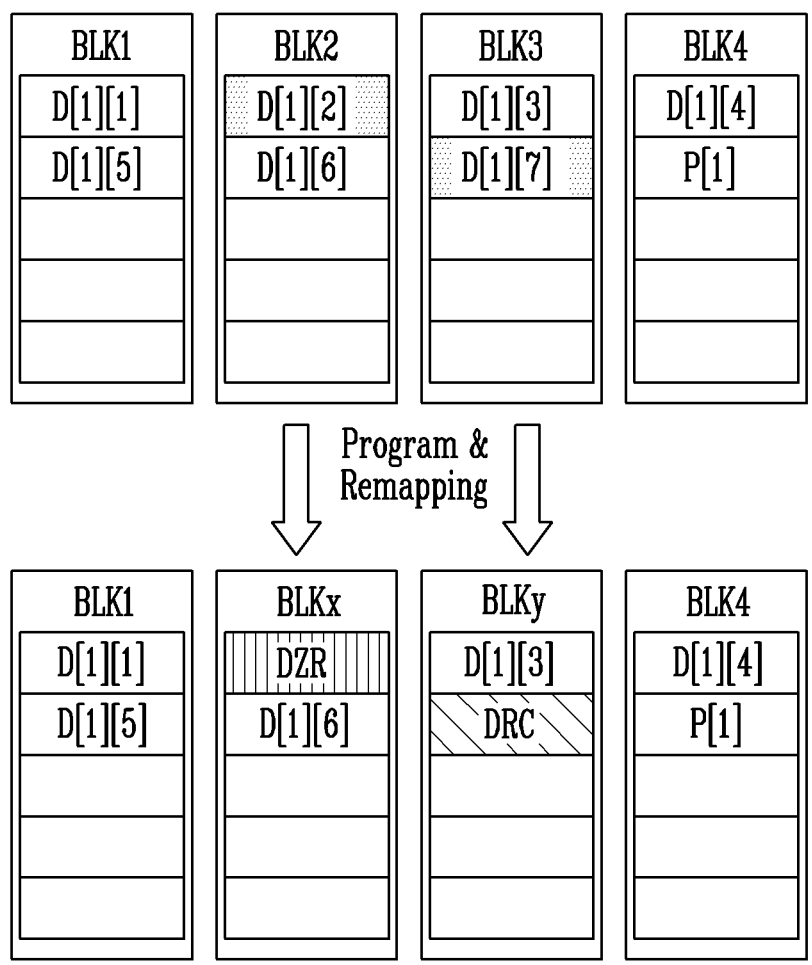
FIG. 18 is a diagram illustrating a method of generating a stripe for recovery based on data for recovery and zero data in the embodiment shown in FIG. 17.

FIG. 18 is a diagram illustrating a method of generating a stripe for recovery based on data for recovery and zero data in the embodiment shown in FIG. 17. The data recovery method according to an embodiment of the present disclosure may be applied even though a program failure occurs for some data in a data stripe. Hereinafter, a case where an uncorrectable error occurs in some of the data included in the first data stripe and a program failure occurs in some data is described as an example.

A case where a program is normally completed with respect to four data D[1][1], D[1][2], D[1][3], and D[1][4] among the data D[1][1], D[1][2], D[1][3], D[1][4], D[1][5], D[1][6], D[1][7], and P[1] included in the first data stripe DS1 is considered. Thereafter, a case where a program failure occurs in the data D[1][7] among the remaining four data D[1][5], D[1][6], D[1][7], and P[1] and the uncorrectable error occurs in the data D[1][2], among the data D[1][1], D[1][2], D[1][3], D[1][4], D[1][5], D[1][6], D[1][7], and P[1] included in the first data stripe DS1, is considered.

In this case, the stripe for recovery may be generated in a method identical to that of a case where two uncorrectable errors occur in one data stripe. That is, the data for recovery DRC is generated by performing an XOR operation on the data D[1][1], D[1][3], D[1][4], D[1][5], D[1][6], and P[1] in which a program failure or an uncorrectable error does not occur among the data D[1][1], D[1][2], D[1][3], D[1][4], D[1][5], D[1][6], D[1][7], and P[1] included in the first data stripe DS1. In addition, the zero data DZR in which all bits are 0 is generated.

Thereafter, the zero data DZR is programmed in the x-th memory block BLKx, which is a free block, instead of the data D[1][2] in which the uncorrectable error occurs among the data programmed in the second memory block BLK2. Another data D[1][6] programmed in the second memory block BLK2 is copied to the x-th memory block BLKx.

The data for recovery DRC is programmed to the y-th memory block BLKy, which is a free block, instead of the data D[1][7] of which the program is failed in the third memory block BLK3. Another data D[1][3] programmed in the third memory block BLK3 is copied to the y-th memory block BLKy.

Thereafter, the physical address mapping of the second memory block BLK2 is remapped to the x-th memory block BLKx, and the physical address mapping of the third memory block BLK3 is remapped to the y-th memory block BLKy. After remapping, the second memory block BLK2 and the third memory block BLK3 may be released as free blocks.

Figure 19:
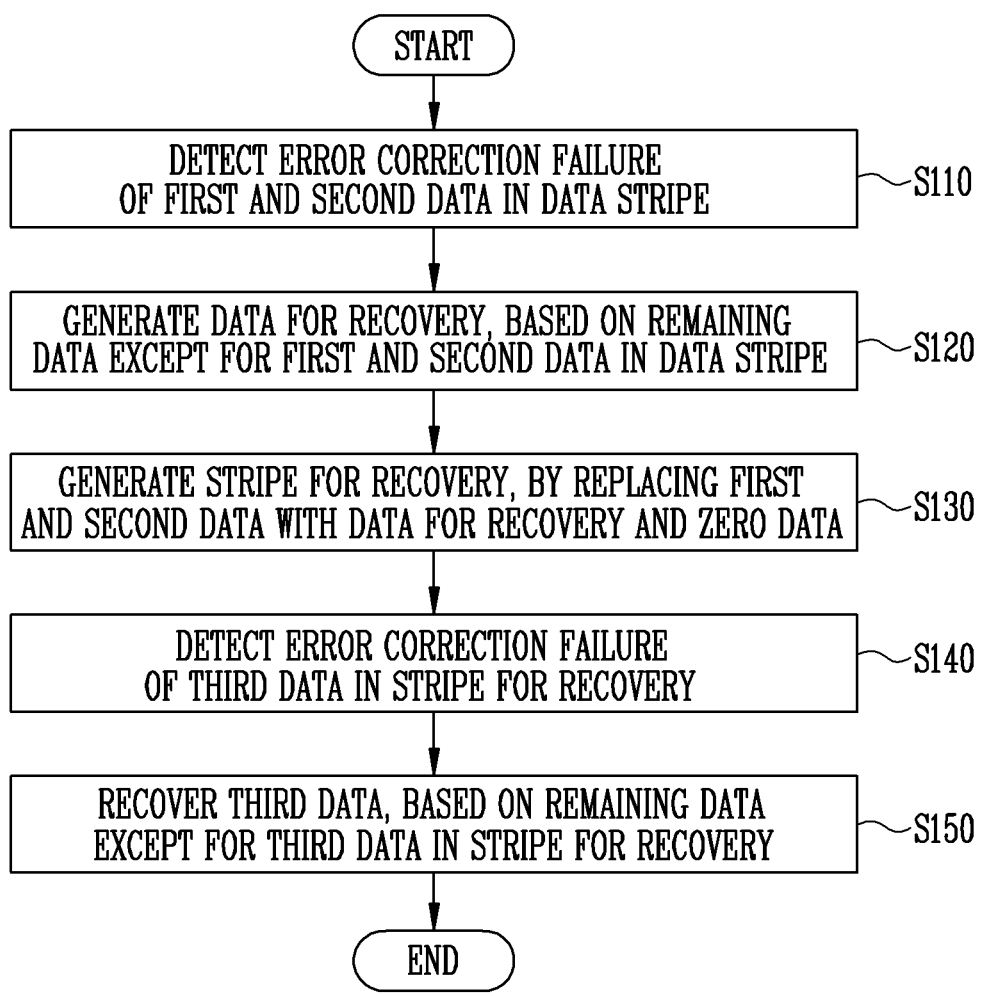
FIG. 19 is a flowchart illustrating a method of operating a controller according to an embodiment of the present disclosure.

FIG. 19 is a flowchart illustrating a method of operating a controller according to an embodiment of the present disclosure.

Referring to FIG. 19, the method includes detecting an error correction failure of first and second data in a data stripe (S110), generating data for recovery DRC based on remaining data except for the first and second data in the data stripe (S120), generating a stripe for recovery by replacing the first and second data with the data for recovery DRC and the zero data DZR (S130), detecting an error correction failure of third data in the stripe for recovery (S140), and recovering the third data based on remaining data except for the third data in the stripe for recovery (S150).

In operation S110, as described with reference to FIGS. 10A to 10D, it may be detected that two uncorrectable errors occur in the data stripe. To this end, the error correction failure reference table described with reference to FIGS. 11A to 11D may be used. A more detailed embodiment of operation S110 is described with reference to FIG. 20.

In operation S120, the data for recovery DRC may be generated as described with reference to FIG. 12A. A more detailed embodiment of the operation S120 is described with reference to FIG. 21. Iin operation S130, as described with reference to FIG. 14, the stripe for recovery may be generated by replacing the data in which the first and second errors occur with the data for recovery DRC and the zero data DZR. A more detailed embodiment of the operation S130 is described with reference to FIG. 22.

In operation S140, it may be detected that the additional uncorrectable error occurs in the stripe for recovery as described with reference to FIG. 15A. In a subsequent operation S150, as described with reference to FIG. 15B, the third data may be recovered by performing an XOR operation on the remaining data except for the third data in which the additional error occurs among data in the stripe for recovery RS1.

Figure 20:
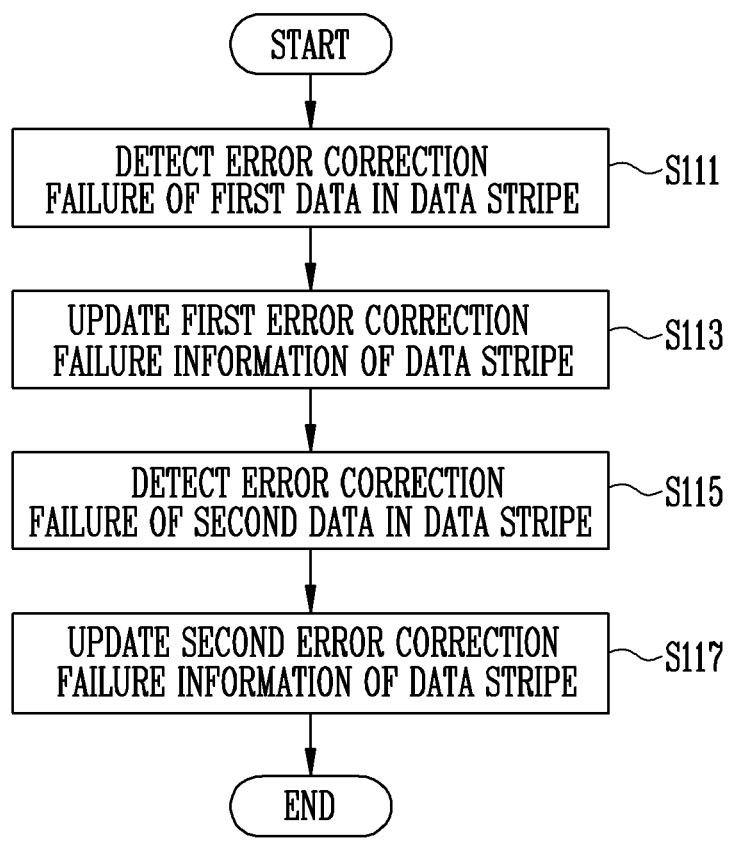
FIG. 20 is a flowchart illustrating an embodiment of S110 of FIG. 19.

FIG. 20 is a flowchart illustrating an embodiment of operation S110 of FIG. 19.

Referring to FIG. 20, detecting the error correction failure of the first and second data in the data stripe shown in FIG.

19 (S110) includes detecting an error correction failure of the first data in the data stripe (S111), updating first error correction failure information of the data stripe, in response to the error correction failure of the first data (S113), detecting an error correction failure of the second data in the data stripe (S115), and updating second error correction failure information of the data stripe, in response to the error correction failure of the second data (S117).

Operation S111 corresponds to an operation of detecting the uncorrectable error for one of the plurality of data in the first data stripe DS1, as described with reference to FIG. 10A.

Operation S113 corresponds to an operation of registering the first data stripe DS1 in the error correction failure reference table and adding information on the data D[1][2] in which the uncorrectable error occurs to the error correction failure reference table, as described with reference to FIGS. 10B and 11A.

Operation S115 corresponds to an operation of detecting the second uncorrectable error among the plurality of data in the first data stripe DS1, as described with reference to FIG. 10C.

Operation S117 corresponds to an operation of adding information on the data D[1][4] in which the second uncorrectable error occurs to the error correction failure reference table, as described with reference to FIGS. 10D and 11D.

Figure 21:
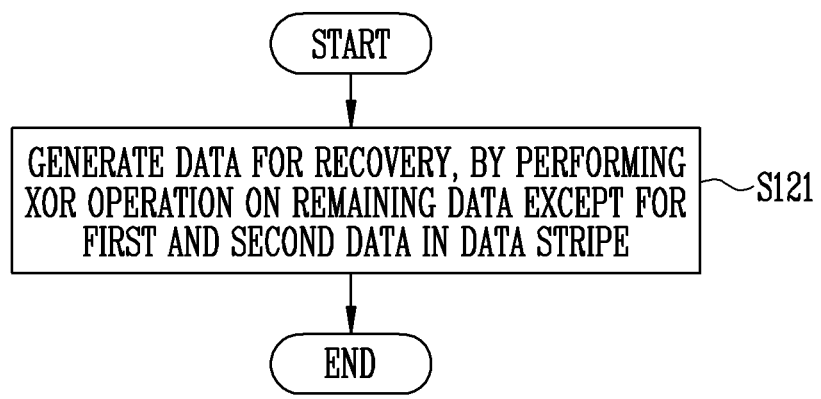
FIG. 21 is a flowchart illustrating an embodiment of S120 of FIG. 19.

FIG. 21 is a flowchart illustrating an embodiment of operation S120 of FIG. 19.

Referring to FIG. 21, generating the data for recovery DRC based on the remaining data except for the first and second data in the data stripe shown in FIG. 19 (S120) may include generating the data for recovery DRC by performing an XOR operation on the remaining data except for the first and second data in the data stripe (S121). In operation S121, the data for recovery DRC may be generated as described with reference to FIG. 12A.

Figure 22:
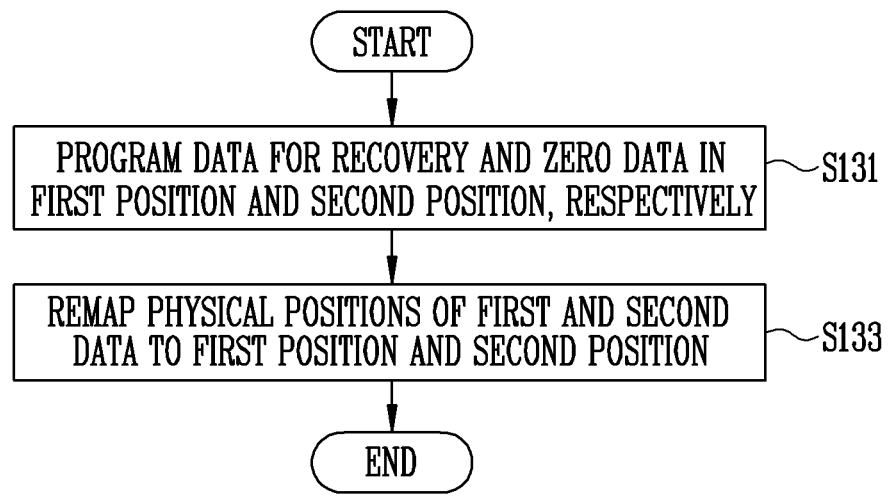
FIG. 22 is a flowchart illustrating an embodiment of S130 of FIG. 19.

FIG. 22 is a flowchart illustrating an embodiment of operation S130 of FIG. 19.

Referring to FIG. 22, generating the stripe for recovery by replacing the first and second data shown in FIG. 19 with the data for recovery DRC and the zero data DZR (S130) includes programming the data for recovery and the zero data to a first position and a second position, respectively (S131), and remapping the physical positions of the first and second data to the first position and the second position (S133).

In operation S131, as described with reference to FIG. 14, the data for recovery DRC and the zero data DZR may be programmed in the i-th memory block BLKi and the j-th memory block BLKj, which are free blocks, respectively. That is, the first position may be included in the i-th memory block BLKi, and the second position may be included in the j-th memory block BLKj.

In operation S133, as described with reference to FIG. 14, the physical address mapping of the second memory block BLK2 may be remapped to the i-th memory block BLKi, and the physical address mapping of the fourth memory block BLK4 may be remapped to the j-th memory block BLKj.

Figure 23:
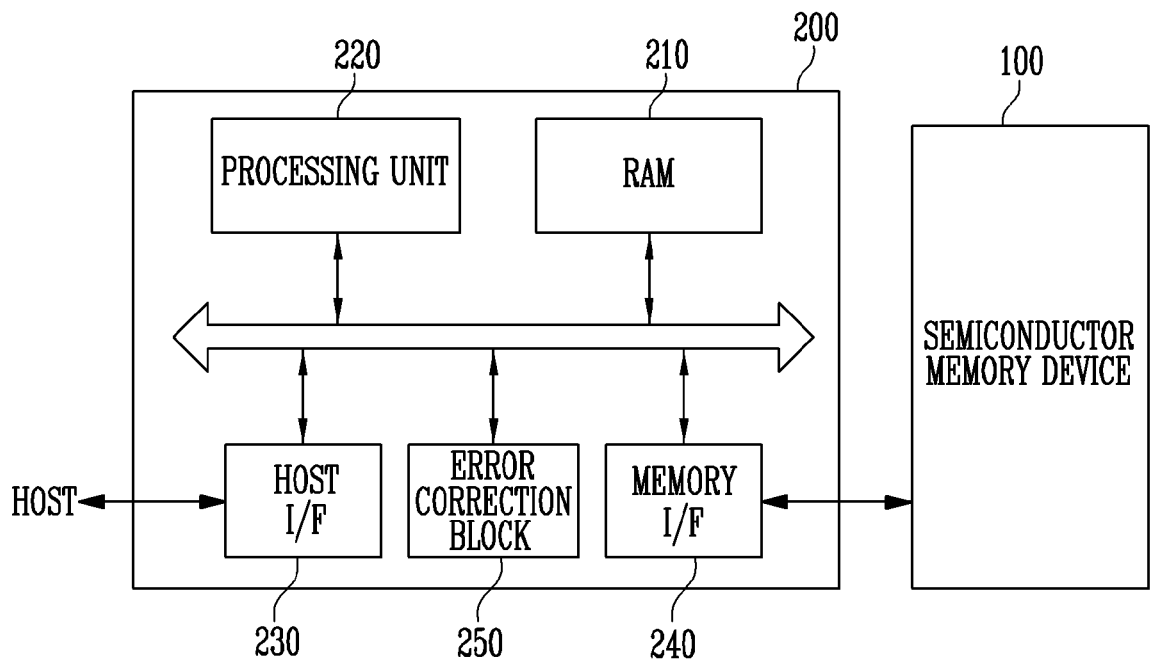
FIG. 23 is a block diagram illustrating an example of the controller shown in FIG. 1.

FIG. 23 is a block diagram illustrating an example of the controller 200 of the memory system 1000 shown in FIG. 1.

Referring to FIG. 23, the controller 200 is connected to the semiconductor memory device 100 and a host HOST. The semiconductor memory device 100 may be the semiconductor memory device described with reference to FIG. 2. The controller 200 corresponds to the controller 200 of FIG. 1 or 7. Hereinafter, a repetitive description is omitted.

The controller 200 is configured to access the semiconductor memory device 100 in response to a request from the host Host. For example, the controller 200 is configured to control read, write, erase, and background operations of the semiconductor memory device 100. The controller 200 is configured to provide an interface between the semiconductor memory device 100 and the host Host. The controller 200 is configured to drive firmware for controlling the semiconductor memory device 100.

The controller 200 includes a random access memory (RAM) 210, a processing unit 220, a host interface (I/F) 230, a memory interface (I/F) 240, and an error correction block 250. The RAM 210 is used as at least one of an operation memory of the processing unit 220, a cache memory between the semiconductor memory device 100 and the host Host, and a buffer memory between the semiconductor memory device 100 and the host Host. The RAM 210 of FIG. 23 may be substantially the same as the data storage 205 of FIG. 7.

The processing unit 220 controls an overall operation of the controller 200. The data recovery controller 215 of FIG. 7 may be configured as firmware executed by the processing unit 220 of FIG. 23.

The host interface 230 includes a protocol for performing data exchange between the host Host and the controller 200. In an embodiment, the controller 200 is configured to communicate with the host Host through at least one of various interface protocols such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial ATA protocol, a parallel ATA protocol, a small computer system interface (SCSI) protocol, an enhanced small disk interface (ESDI) protocol, an integrated drive electronics (IDE) protocol, and a private protocol.

The memory interface 240 interfaces with the semiconductor memory device 100. For example, the memory interface 1240 includes a NAND interface or a NOR interface. The memory interface 240 of FIG. 23 may be substantially the same as the memory interface 240 of FIG. 7.

The error correction block 250 is configured to detect and correct an error of data received from the semiconductor memory device 100 using an error correcting code (ECC). The processing unit 220 may control the semiconductor memory device 100 to adjust a read voltage and perform re-read according to an error detection result of the error correction block 250. In an embodiment, the error correction block 250 may be provided as a component of the controller 200. The error correction block 250 of FIG. 23 may be substantially the same as the error correction block 250 of FIG. 7.

The controller 200 and the semiconductor memory device 100 may be integrated into one semiconductor device. In an embodiment, the controller 200 and the semiconductor memory device 100 may be integrated into one semiconductor device to form a memory card. For example, the controller 200 and the semiconductor memory device 100 may be integrated into one semiconductor device to form a memory card such as a PC card (i.e., personal computer memory card international association (PCMCIA)), a compact flash card (CF), a smart media card (e.g., SM or SMC), a memory stick, a multimedia card (e.g., MMC, RS-MMC, or MMCmicro), a secure digital (SD) card (e.g., SD, miniSD, microSD, or SDHC), and a universal flash storage (UFS).

The controller 200 and the semiconductor memory device 100 may be integrated into one semiconductor device to form a semiconductor drive (e.g., solid state drive (SSD)). The semiconductor drive (SSD) includes the memory system 1000 configured to store data in a semiconductor memory. When the memory system 1000 including the controller 200 and the semiconductor memory device 100 is used as the semiconductor drive (SSD), an operation speed of the host connected to the memory system 1000 is dramatically improved.

As another example, the memory system 1000 including the controller 200 and the semiconductor memory device 100 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, and a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 100 or the memory system including the same may be mounted as a package of various types. For example, the semiconductor memory device 100 or the memory system may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), a multi-chip package (MCP), a wafer-level fabricated package (WFP), or a wafer-level processed stack package (WSP).

Figure 24:
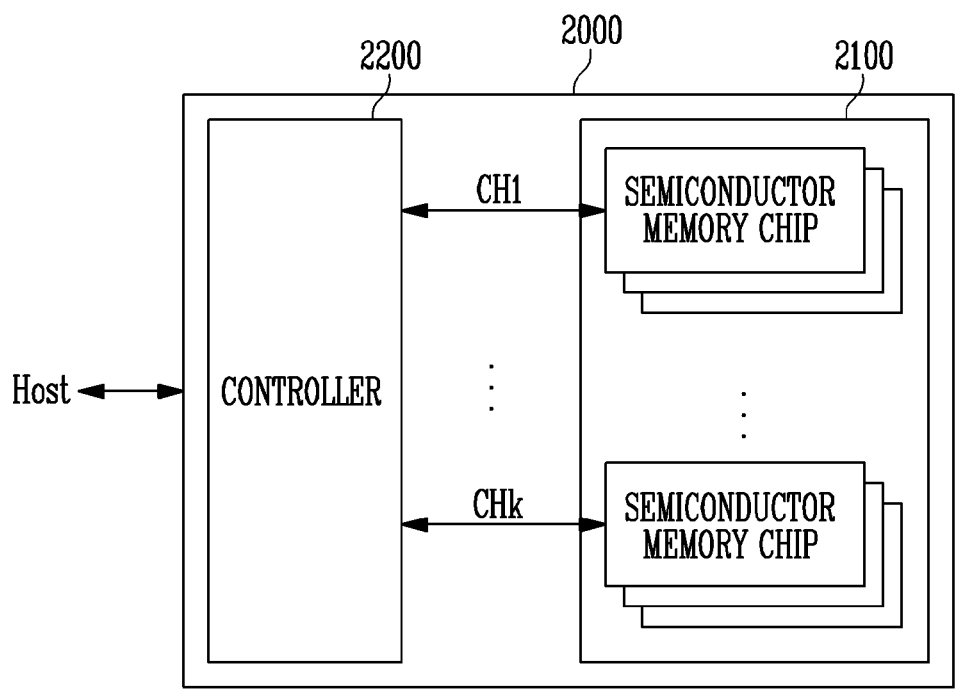
FIG. 24 is a block diagram illustrating an application example of the memory system of FIG. 1.

FIG. 24 is a block diagram illustrating an application example of the memory system of FIG. 1.

Referring to FIG. 24, the memory system 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 24, the plurality of groups communicate with the controller 2200 through first to k-th channels CH1 to CHk, respectively. Each semiconductor memory chip is configured and is operated similarly to that of the semiconductor memory device 100 described with reference to FIG. 2.

Each group is configured to communicate with the controller 2200 through one common channel. The controller 2200 is configured similarly to the controller 200 described with reference to FIG. 23 and is configured to control the plurality of memory chips of the semiconductor memory device 2100 through the plurality of channels CH1 to CHk.

Figure 25:
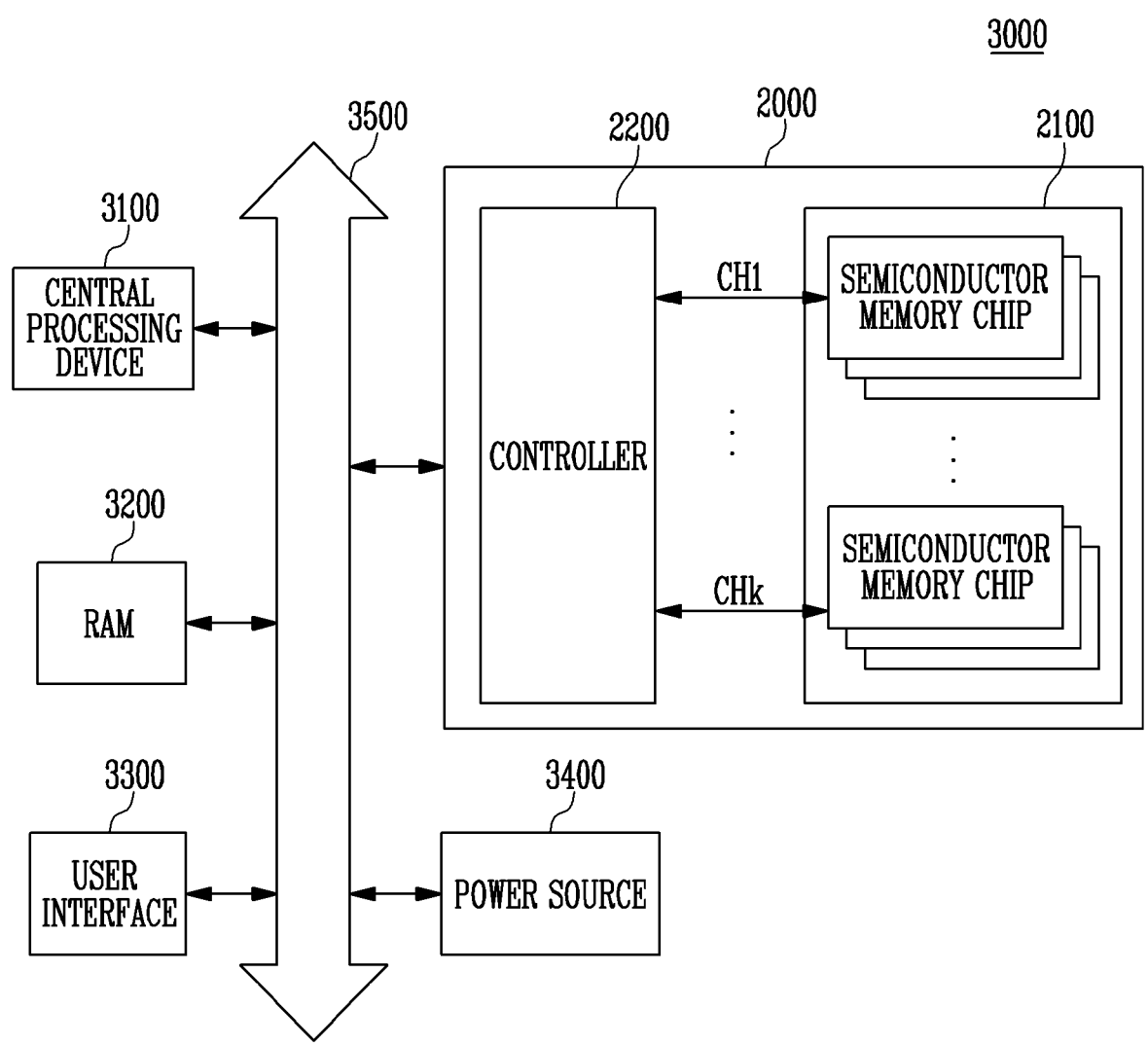
FIG. 25 is a block diagram illustrating a computing system including the memory system described with reference to FIG. 24.

FIG. 25 is a block diagram illustrating a computing system 3000 including the memory system 2000 described with reference to FIG. 24.

Referring to FIG. 25, the computing system 3000 includes a central processing device 3100, a random access memory (RAM) 3200, a user interface 3300, a power source 3400, a system bus 3500, and the memory system 2000.

The memory system 2000 is electrically connected to the central processing device 3100, the RAM 3200, the user interface 3300, and the power source 3400 through the system bus 3500. Data provided through the user interface 3300 or processed by the central processing device 3100 is stored in the memory system 2000.

In FIG. 25, the semiconductor memory device 2100 is connected to the system bus 3500 through the controller 2200. However, the semiconductor memory device 2100 may be configured to be directly connected to the system bus 3500. At this time, a function of the controller 2200 is performed by the central processing device 3100 and the RAM 3200.

In FIG. 25, the memory system 2000 described with reference to FIG. 24 is provided. However, the memory system 2000 may be replaced with the memory system 1000 including the controller 200 and the semiconductor memory device 100 described with reference to FIG. 23.

The embodiments of the present disclosure disclosed in the present specification and drawings are merely provided with specific examples to easily describe the technical content of the present disclosure and to help understanding of the present disclosure, and are not intended to limit the scope of the present disclosure. It is apparent to those of ordinary skill in the art that other modified examples based on the technical spirit of the present disclosure may be implemented in addition to the embodiments disclosed herein.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

While the present disclosure has been illustrated and described with respect to specific embodiments, the disclosed embodiments are provided for description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. A memory system comprising:
    at least one semiconductor memory device including a plurality of memory blocks in which an original data stripe including a plurality of unit data and parity data generated from the plurality of unit data is stored; and
    a controller configured to control an operation of the semiconductor memory device, wherein the controller performs an error correction operation on one or more unit data received from the semiconductor memory device, and generates data for recovery based on the parity data and remaining unit data except for first and second unit data among the plurality of unit data and zero data including zero bits, in response to a first error correction failure for the first unit data among the plurality of unit data and a second error correction failure for the second unit data, and wherein the controller generates a stripe for recovery by replacing one of the first and second unit data included in the original data stripe with the data for recovery and replacing another of the first and second unit data with the zero data.

2. The memory system of claim 1, wherein the parity data is data generated by performing an exclusive OR (XOR) operation on the plurality of unit data, and wherein the controller generates the data for recovery by performing an XOR operation on the parity data and the remaining unit data except for the first and second unit data among the plurality of unit data included in the original data stripe.

3. The memory system of claim 1, wherein the controller controls the semiconductor memory device to store the stripe for recovery.

4. The memory system of claim 3, wherein the controller controls the semiconductor memory device to program the data for recovery in a first position and program the zero data in a second position, remaps one of physical positions mapped to the first and second unit data to the first position, and remaps another of the physical positions to the second position, and wherein the first position and the second position are included in a memory block different from the plurality of memory blocks in which the original data stripe is stored.

5. The memory system of claim 4, wherein the controller recovers third unit data based on the stripe for recovery, in response to a third error correction failure for the third unit data included in the stripe for recovery.

6. The memory system of claim 5, wherein the controller recovers the third unit data by performing an XOR operation on the parity data and remaining unit data except for the third unit data among the plurality of unit data included in the stripe for recovery.

7. The memory system of claim 1, wherein the controller registers information on the original data stripe and the first unit data in an error correction failure reference table, in response to the first error correction failure, and adds information on the second unit data to the error correction failure reference table, in response to the second error correction failure.

8. A method of operating a controller, the method comprising:
controlling at least one semiconductor memory device including a plurality of memory blocks in which an original data stripe includes a plurality of unit data and parity data generated from the plurality of unit data;
detecting an error correction failure of first and second unit data in the original data stripe;
generating data for recovery based on the parity data and remaining unit data except for the first and second unit data among the plurality of unit data in the original data stripe; and
generating a stripe for recovery by replacing one of the first and second unit data with the data for recovery and replacing another of the first and second unit data with zero data, wherein the zero data is data including zero bits.

9. The method of claim 8, wherein detecting the error correction failure of the first and second unit data in the original data stripe comprises:
detecting a first error correction failure for the first unit data in the original data stripe;
updating first error correction failure information of the original data stripe in an error correction reference table;
detecting a second error correction failure for the second unit data in the original data stripe; and
updating second error correction failure information of the original data stripe in the error correction reference table.

10. The method of claim 8, wherein generating the data for recovery based on the parity data and the remaining unit data except for the first and second unit data among the plurality of unit data in the original data stripe comprises generating the data for recovery by performing an exclusive OR (XOR) operation on the remaining unit data and the parity data.

11. The method of claim 8, wherein generating the stripe for recovery comprises:
controlling the semiconductor memory device to program the data for recovery to a first position in the semiconductor memory device and program the zero data to a second position in the semiconductor memory device; and
remapping one of physical positions mapped to the first and second unit data to the first position, and remapping another of the physical positions to the second position.

12. The method of claim 11, wherein the first position and the second position are included in a memory block different from the plurality of memory blocks in which the original data stripe is stored.

13. The method of claim 12, further comprising:
detecting a third error correction failure for third unit data in the stripe for recovery; and
recovering the third unit data based on the parity data and remaining unit data except for the third unit data among the plurality of unit data included in the stripe for recovery.

14. The method of claim 13, wherein recovering the third unit data comprises performing an XOR operation on the parity data and the remaining unit data except for the third unit data among the plurality of unit data included in the stripe for recovery.

15. A memory system comprising:
a memory device including a plurality of memory blocks; and
a controller configured to:
write a data stripe to the plurality of memory blocks, the data stripe including a plurality of unit data and parity data generated from and associated with the plurality of unit data, such that data of the data stripe are respectively written to the plurality of memory blocks;
perform an error correction operation on one or more unit data received from the plurality of memory blocks;
when an error correction failure for first unit data among the plurality of unit data is detected, generate recovery data using the parity data and remaining unit data except for the first unit data among the plurality of unit data;

when an error correction failure for second unit data among the plurality of unit data is detected, generate all zero data;

select first and second memory blocks among the plurality of memory blocks in which the first and second unit data are written, respectively; and write data of the first and second memory blocks to first and second free blocks, respectively, wherein the data of the first memory block includes the recovery data instead of the first unit data, and the data of the second memory block includes the all zero data instead of the second unit data.

\* \* \* \* \*